United States Patent
Deng et al.

(10) Patent No.: US 12,420,679 B2
(45) Date of Patent: Sep. 23, 2025

(54) SEAT CONTROL METHOD, SEAT CONTROLLER AND COMPUTER PROGRAM PRODUCT

(71) Applicant: BEIJING JINGWEI HIRAIN TECHNOLOGIES CO., INC., Beijing (CN)

(72) Inventors: Haibo Deng, Beijing (CN); Xueyan Zang, Beijing (CN); Miaomaio Quan, Beijing (CN)

(73) Assignee: BEIJING JINGWEI HIRAIN TECHNOLOGIES, Beijing (CN)

(*) Notice: Subject to any disclaimer, the term of this patent is extended or adjusted under 35 U.S.C. 154(b) by 0 days.

(21) Appl. No.: 18/265,770

(22) PCT Filed: Oct. 11, 2022

(86) PCT No.: PCT/CN2022/124721
§ 371 (c)(1),
(2) Date: Jun. 7, 2023

(87) PCT Pub. No.: WO2023/066092
PCT Pub. Date: Apr. 27, 2023

(65) Prior Publication Data
US 2024/0042900 A1  Feb. 8, 2024

(30) Foreign Application Priority Data

Oct. 20, 2021 (CN) .......................... 202111220428.3
Dec. 28, 2021 (CN) .......................... 202111628708.8

(51) Int. Cl.
*B60N 2/02* (2006.01)
*B60N 2/005* (2006.01)

(52) U.S. Cl.
CPC ....... *B60N 2/0277* (2023.08); *B60N 2/02246* (2023.08); *B60N 2002/0055* (2013.01); *B60N 2/02258* (2023.08)

(58) Field of Classification Search
CPC .............. B60N 2/0277; B60N 2/02246; B60N 2/02258; B60N 2002/0055; B60N 2220/20; B60N 2/065; B60N 2/22
See application file for complete search history.

(56) References Cited

U.S. PATENT DOCUMENTS

2011/0062737 A1* 3/2011 Kroener ............. B60N 2/02246
                                                      297/378.12
2018/0345834 A1* 12/2018 Lion .................... B60N 2/5685

FOREIGN PATENT DOCUMENTS

CN  202193004 U  *  4/2012  ............... B60N 2/30
CN  106335407 A  *  1/2017  ........... B60N 2/0232
(Continued)

OTHER PUBLICATIONS

English Translation of JP2010187507A (Year: 2010).*
(Continued)

*Primary Examiner* — Shardul D Patel
*Assistant Examiner* — Alexander V Gentile
(74) *Attorney, Agent, or Firm* — Haverstock & Owens, A Law Corporation

(57) ABSTRACT

The application provides a seat control method, a seat controller and a product, which are applicable to the technical field of automobiles. In the application, after driving of a seat motor is stabilized and during operation of the seat motor, for each of cycles, present driving current is compared with a temporary current value corresponding to a previous cycle to determine a difference, and current change trend of each of the cycles is determined. In a case where the current change trend of the present cycle is the same as the current change trend of the previous cycle, an increment of (Continued)

a current locking accumulative count value is increased. A locking flag for indicating stopping of the seat motor can be determined more quickly so as to realize an anti-pinch function, and thus an anti-pinch event can be detected quickly and accurately.

20 Claims, 10 Drawing Sheets

(56)  References Cited

FOREIGN PATENT DOCUMENTS

| | | | | | |
|---|---|---|---|---|---|
| CN | 108590425 | A | * | 9/2018 | ............... E05F 15/40 |
| CN | 109435789 | A | * | 3/2019 | ........... B60N 2/0232 |
| CN | 109532377 | A | * | 3/2019 | ........... B60G 17/015 |
| CN | 109532577 | A | * | 3/2019 | ......... B60N 2/02246 |
| CN | 110206437 | A | * | 9/2019 | ............... E05F 15/42 |
| CN | 110439413 | A | * | 11/2019 | ............. E04G 23/02 |
| CN | 111169332 | A | * | 5/2020 | ........... B60N 2/0232 |
| CN | 210591495 | U | * | 5/2020 | ........... B60N 2/1807 |
| CN | 111367205 | A | * | 7/2020 | ............. G01B 7/003 |
| CN | 112477705 | A | * | 3/2021 | ........... B60N 2/0232 |
| CN | 112477766 | A | * | 3/2021 | ................ B60R 7/10 |
| DE | 19958676 | C1 | * | 2/2001 | ........... B60N 2/3031 |
| DE | 102008012817 | A1 | | 9/2009 | |
| EP | 0238770 | A1 | * | 12/1986 | ............... B60N 1/06 |
| FR | 3100492 | A1 | * | 3/2021 | ........... B60N 2/0232 |
| JP | 2010187507 | A | * | 8/2010 | ................ H02P 7/06 |
| JP | 2013022216 | A | * | 2/2013 | ................ A47C 7/46 |
| KR | 2020065312 | A | * | 6/2020 | ........... B60N 2/0228 |
| KR | 20200065312 | A | | 6/2020 | |
| KR | 20200078195 | A | * | 7/2020 | ........... B60N 2/0232 |

OTHER PUBLICATIONS

English Translation of CN106696867A (Year: 2017).*
The International Search Report for PCT Patent Application No. PCT/CN2022/124721, 4 pages.
The Chinese Office Action issued Jul. 1, 2024 for Chinese Patent No. 202111220428.3.
The European Search Report issued Sep. 3, 2024 for European Patent No. 22882702.8.

* cited by examiner

SEAT CONTROL METHOD, SEAT CONTROLLER AND COMPUTER PROGRAM PRODUCT

CROSS REFERENCE OF RELATED APPLICATIONS

The application is a national stage of International patent application No. PCT/CN2022/124721, filed on Oct. 11, 2022, which claims priorities of the Chinese patent application No. 202111628708.8 filed in China on Dec. 28, 2021 and the Chinese patent application No. 202111220428.3 filed in China on Oct. 20, 2021, both of which are hereby incorporated by reference in their entireties.

TECHNICAL FIELD

The application belongs to the technical field of automobiles, in particular to a seat control method, a seat controller and a computer program product.

BACKGROUND

With development of automobile technologies, more and more vehicles have been added with an anti-pinch detection strategy in their control processes, such as an anti-pinch detection during movement of their windows, skylights and electric seats. The anti-pinch detection can effectively avoid possible injuries to users during movement of related components, and is helpful to improve safety in use of the vehicles.

SUMMARY

In a first aspect, the application provides a seat control method, including: acquiring, after driving of a seat motor is stabilized, driving currents of the seat motor according to preset cycles, and determining the driving current in a first cycle as a temporary current value corresponding to the first cycle; comparing, during operation of the seat motor and for each of the cycles, the driving current of a present cycle and a temporary current value corresponding to a previous cycle to determine a difference, and determining a temporary current value corresponding to each of the cycles and current change trend of each of the cycles; comparing the current change trend of a present cycle with the current change trend of the previous cycle, and increasing an increment of a current locking accumulative count value in a case where the current change trend of the present cycle is the same as the current change trend of the previous cycle, wherein an change in the current locking accumulative count value is associated with the difference between the driving current of the present cycle and the temporary current value corresponding to the previous cycle; and determining a locking flag according to a magnitude relationship between the current locking accumulative count value and a first threshold.

In a second aspect, the application provides a seat controller, including: an anti-pinch detection module and a motor driving module, wherein the anti-pinch detection module includes a first acquisition unit, current change trend determination unit, a current locking accumulative count value increment determination unit, and a locking flag determination unit; wherein the first acquisition unit is configured to acquire, after driving of a seat motor is stabilized, driving currents of the seat motor according to preset cycles, and determine the driving current in a first cycle as a temporary current value corresponding to the first cycle; the current change trend determination unit is configured to compare, during operation of the seat motor and for each of the cycles, the driving current of a present cycle and a temporary current value corresponding to a previous cycle to determine a difference, and determine a temporary current value corresponding to each of the cycles and current change trend of each of the cycle; the current locking accumulative count value increment determination unit is configured to compare the current change trend of a present cycle with the current change trend of the previous cycle, and increase an increment of a current locking accumulative count value in a case where the current change trend of the present cycle is the same as the current change trend of the previous cycle, wherein an change in the current locking accumulative count value is associated with the difference between the driving current of the present cycle and the temporary current value corresponding to the previous cycle; and the locking flag determining unit is configured to determine a locking flag according to a magnitude relationship between the current locking accumulative count value and a first threshold; and wherein the motor driving module is communicatively coupled with the anti-pinch detection module, and is configured to receive the locking flag outputted by the anti-pinch detection module to stop driving of the seat motor in a motor driving mode.

In a third aspect, the application provides a computer program product, having instructions therein, wherein the instructions, when executed by a processor of an electronic device, cause the electronic device to perform a seat control method according to the first aspect.

BRIEF DESCRIPTION OF THE DRAWINGS

In order to more clearly describe technical solutions in embodiments of the application or in the existing art, the following will briefly introduce drawings required in description of the embodiments or the existing art. Obviously, the drawings in the following description are merely some embodiments of the application, and other drawings can be obtained by a person skilled in the art based on these drawings without paying creative efforts.

DETAILED DESCRIPTION

Figure 1:
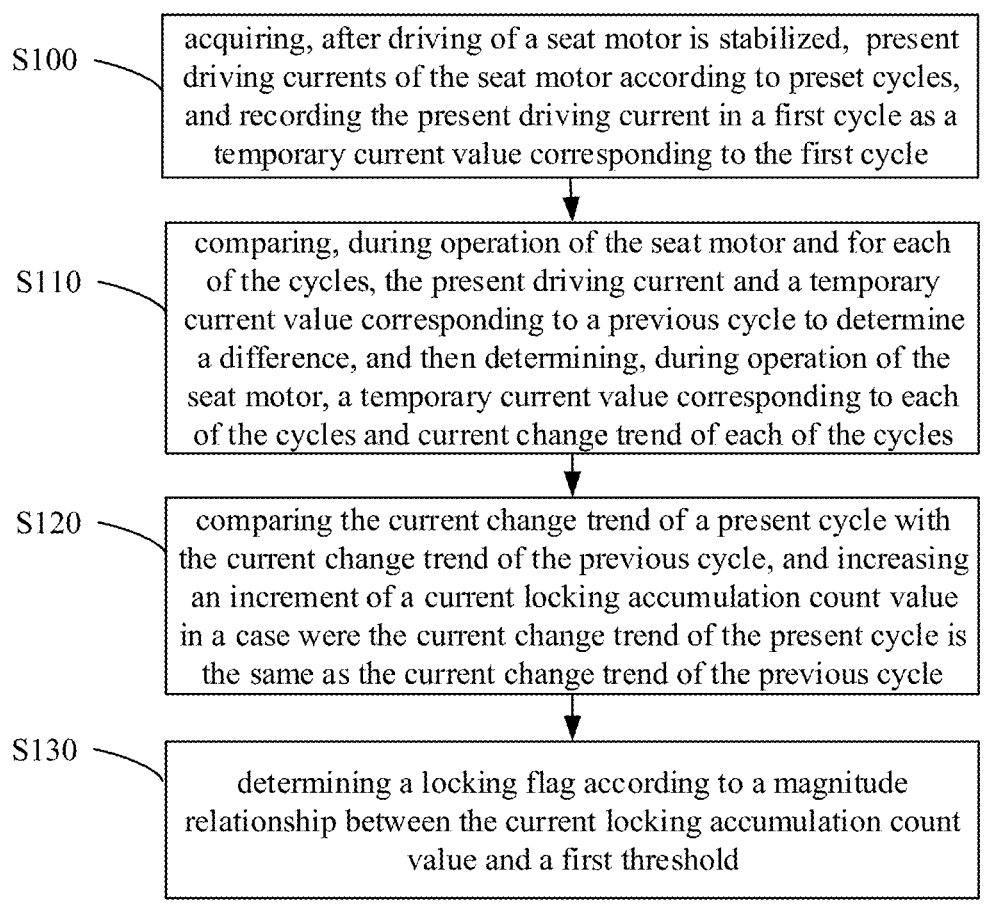
FIG. 1 is a first flowchart of a seat control method according to an embodiment of the application.

In order to make purposes, technical solutions and advantages of the embodiments of the application clearer, the following will describe the technical solutions in the embodiments of the application clearly and completely in combination with the drawings for the embodiments of the application. Obviously, the described embodiments are merely a part of the embodiments of the application, not all of embodiments of the application. Based on the embodiments of the application, other embodiments obtained by a person skilled in the art without paying creative efforts all fall within scope of protection of the application.

In the existing art, an entire travel of a seat is divided into multiple travel intervals. For example, the entire travel of the seat may correspond to 1000 Hall counts, and a travel interval with 20 Hall counts may be defined as one segment. Based on this, the entire travel can be divided into 50 travel intervals. Since load and working voltage of a seat motor may change during movement of the seat in any travel interval, a driving current of the seat motor in a different travel interval may be different. In an anti-pinch detection, a controller compares a driving current in a current travel interval with an average driving current in a previous travel interval. If their difference is greater than a first threshold, the average driving current in the previous travel interval is taken as a locking current. After that, if a driving current in any travel interval has a greater difference with the locking current than a second preset threshold, it is determined that an anti-pinch event has occurred.

However, in a practical application, an electric seat moves very slowly and package for the seat is very soft, which causes a smaller increase in the driving current of the seat motor, and thus a difference between driving currents in adjacent cycles may not be large enough to accurately determine the locking current, thereby affecting timeliness of the anti-pinch detection.

The seat control method according to the embodiments of the application is applicable to an electric seat control system, specifically to a system controller of the electric seat control system, and is also applicable to any other controller in the vehicle that can control an electric seat. Of course, in some cases, it is also applicable to a controller at a network side. The controller applying the seat control method may be called as a seat controller.

Furthermore, the seat control method according to the embodiments of the application, when applied, has its dispatching operations repeated periodically according to a preset cycle. The preset cycle may be set according to an actual control demand, for example, it may be executed every 10 ms. Duration of the preset cycle is not limited in the application. Hereinafter, a cycle to which current time belongs is defined as a present cycle, and correspondingly, a cycle that is adjacent to the present cycle and in which execution has been finished before the present cycle is defined as a previous cycle.

FIG. 1 is a first flowchart of a seat control method according to an embodiment of the application. The seat control method according to the embodiment include steps: S100, S110, S120 and S130.

At S100, after driving of a seat motor is stabilized, present driving currents of the seat motor are acquired according to preset cycles, and the present driving current in a first cycle is recorded as a temporary current value corresponding to the first cycle.

An electric seat control system can include a seat, a transmission mechanism, a seat motor, a system controller and other parts. The system controller controls operation of the seat motor, and further adjusts a position of the seat via the transmission mechanism.

During the seat motor controls the seat for position adjustment, if there is an obstacle or external resistance in a moving direction of the seat, load of the seat motor would change, which leads to a change in its driving current, and moreover, since magnitude of the driving current is directly related to magnitude of the load, any change in the driving current can be used to judge whether there is an obstacle in the moving direction of the seat, that is, whether there is an anti-pinch event. Therefore, after the driving of the seat motor is stabilized (for example, the seat motor is started and stabilized), present driving currents of the seat motor are acquired according to preset cycles. It should be understood that in a practical application, specific values of respective present driving currents acquired in different cycles may be different.

As previously mentioned, the magnitude of the driving current is directly related to the magnitude of the load. If there is an obstacle in the moving direction of the seat, there would be a change in load current. The temporary current value described in the embodiment is used herein to represent a change in the magnitude of the present driving current. In addition, the present driving current of a first cycle after the driving of the seat motor is stabilized is recorded as the temporary current value corresponding to the first cycle.

Of course, as another implementation, in the first cycle after the driving of the seat motor is stabilized, an initial current value may be set according to performance parameters of the seat motor, and the initial current value may be taken as the temporary current value corresponding to the first cycle.

Except for the first cycle, the temporary current value corresponding to each of the other cycles will be updated according to the present driving current. A specific update process is not be detailed here, but will be described in following descriptions.

Optionally, in a starting process for the seat, that is, an initial stage where the seat is started to move from a static state, due to an influence of inertia and the like, the driving current of the seat motor is not very stable, and there is a lower probability that an anti-pinch event may occur at this stage. Therefore, the step is performed preferably after the driving current is stabilized. To do so, the embodiment of the application may determine whether driving by the seat motor is stabilized by the following way:

performing statistics, after obtaining a motor starting command, on a duration in which the seat motor is started (i.e. duration in which the seat motor is controlled to be started to operate, which may be implemented by an existing starting control algorithm) in response to the motor starting command; and determining that driving of the seat motor is stabilized in a case where the duration in which the seat motor is started reaches a starting duration threshold, such as 300 ms.

Of course, a specific value of the starting duration threshold is related to specific performance of the seat motor and an involved application scenario, and is not limit in the application.

At S110, during operation of the seat motor and for each of the cycles, the present driving current is compared with a temporary current value corresponding to a previous cycle to determine a difference, and a temporary current value corresponding to each of the cycles and current change trend of each of the cycles are determined.

During operation of the seat motor and for each of the cycles, a difference between the present driving current and the temporary current value is calculated. When the resulted difference is greater than a positive value of an absolute value of a current threshold, a current locking accumulative count value is increased by an increment of the current locking accumulative count value in the present cycle. Further, the present driving current is recorded as the temporary current value corresponding to the present cycle, and current change trend of the driving current is recorded as increase in current in the case where the current locking accumulative count value is increased.

Correspondingly, when the difference value obtained is smaller than a negative value of the absolute value of the current threshold, the current locking accumulative count value is decreased by the increment of the current locking accumulative count value in the present cycle. Further, the present driving current is recorded as the temporary current value corresponding to the present cycle, and the current change trend is recorded as decrease in current in such case that the current locking accumulative count value is decreased.

Optionally, in a practical application, a current change trend identification bit may be set to record the current change trend of the driving current. For example, an identification bit 1 may be used to indicate the increase in current, and an identification bit 0 may be used to indicate the decrease in current.

When the difference is not greater than the positive value of the absolute value of the current threshold or is not smaller than the negative value of the absolute value of the current threshold, that is, the difference is greater than or equal to the negative value of the absolute value of the current threshold and less than or equal to the positive value of the absolute value of the current threshold, a temporary current update count value is increased, and the temporary current value corresponding to the previous cycle is recorded as the temporary current value corresponding to the present cycle.

Furthermore, in any cycle, when it is determined that the current change trend of the driving current is either increase or decrease in current, it is necessary to clear the temporary current update count value.

For the above descriptions, it should be noted that a change in the current locking accumulative count value described in the embodiment is related to the difference between the present driving current and the temporary current value corresponding to the previous cycle, and is used to indicate a changing situation of the driving current. In addition, it can be seen, from the above processes, that, when the driving current continues to increase, the current locking accumulative count value will also continue to increase, and conversely, when the driving current continues to decrease, the current locking accumulative count value will also continue to decrease. Therefore, the current locking accumulative count value can be used as a basis for determining whether an anti-pinch event occurs.

It can be seen from the increasing and clearing processes of the temporary current update count value in the above descriptions that the temporary current update count value is used to represent a duration in which the temporary current value is not updated. The larger the temporary current update count value, the longer the duration in which the temporary current value is not updated. Thus, if the temporary current value is updated in any cycle, the temporary current update count value is cleared.

As for the absolute value of the current threshold, it may be set according to actual performance parameters of the seat motor and control requirements for an anti-pinch detection in a practical application. An actual value of the absolute value of the current threshold is not limited in the application.

At S120, the current change trend of the present cycle is compared with the current change trend of the previous cycle, and an increment of the current locking accumulative count value is increased in a case where the current change trend of the present cycle is the same as the current change trend of the previous cycle.

An increment of the current locking accumulative count value represents a change amount in value of the current locking accumulative count value that is to be increased or decreased in each of the cycles. In a case both the current change trend of the previous cycle and the current change trend of the present cycle are either increase or decrease in current, that is, in a case where the current change trend of the previous cycle and the current change trend of the present cycle are the same, the increment of the current locking accumulative count value is increased, such that the current locking accumulative count value in a cycle next to the present cycle is greater than the current locking accumulative count value in the present cycle.

It can be seen from the above that the greater the increment of the current locking accumulative count value, the faster the change of the current locking accumulative count value, and when the driving current keeps on increasing slowly, the current locking accumulative count value will increase rapidly, and in turn a locking flag will be outputted quickly, so as to achieve fast and accurate detection of an anti-pinch event. On the contrary, the smaller the increment of the current locking accumulative count value, the slower the change of the current locking accumulative count value.

Furthermore, the increment of the current locking accumulative count value being increased indicates that the change of the driving current meets the aforementioned conditions for clearing the temporary current update count value, and thus the temporary current update count value is cleared.

It can be seen from the above descriptions that execution of S110 and S120 are highly related. The following describes optional implementations of S110 and S120 in practical applications through more specific implementations shown in FIGS. 2 to 4.

Figure 2:
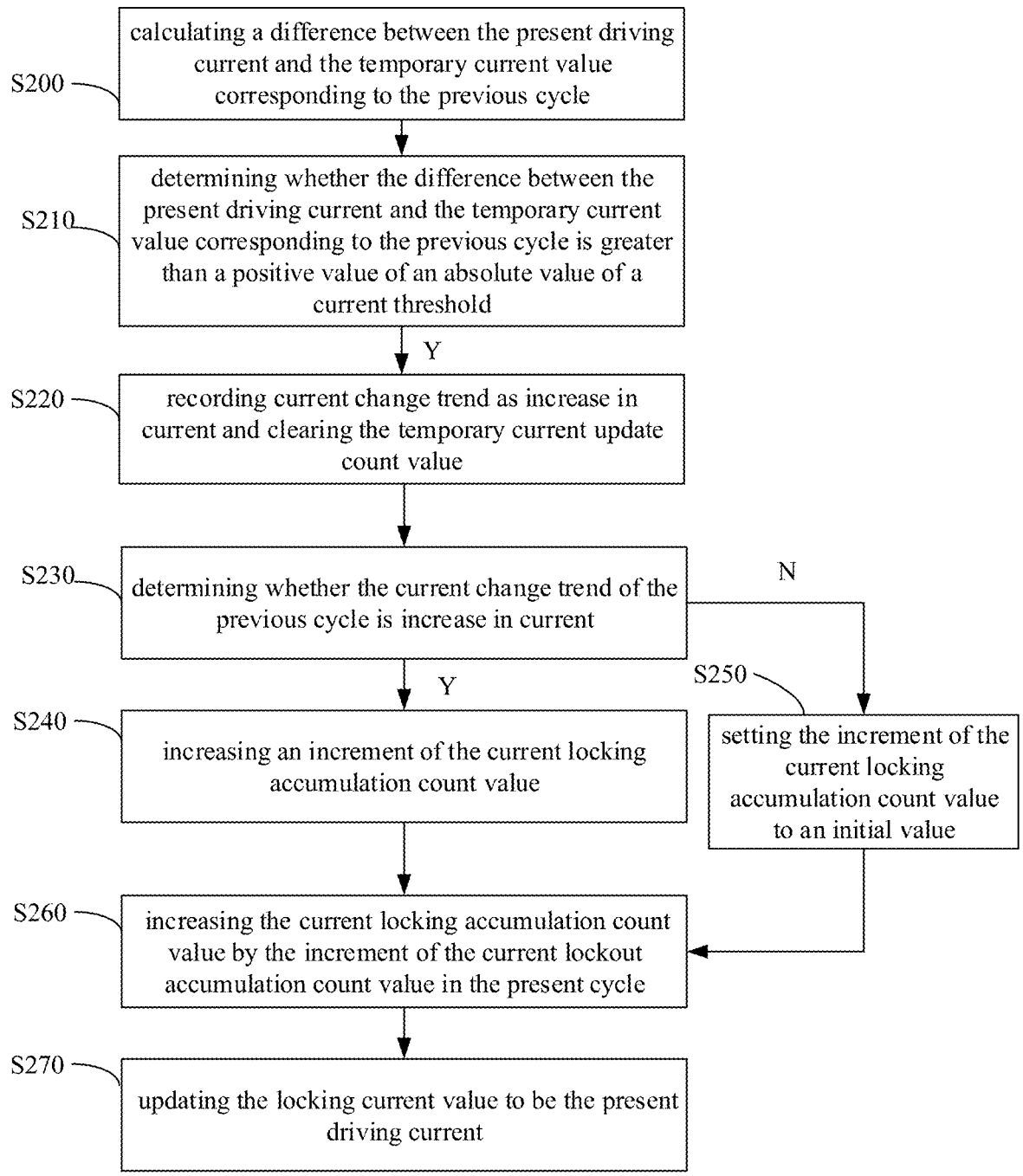
FIG. 2 is a flowchart for calculating a current locking accumulative count value according to an embodiment of the application.

Optionally, as shown in FIG. 2, which is a flowchart for calculating a current locking accumulative count value according to an embodiment of the application, the process includes steps S200, S210, S220, S230, S240, S250, S260 and S270.

At S200, a difference between the present driving current and the temporary current value corresponding to the previous cycle is calculated.

At S210, whether the difference between the present driving current and the temporary current value corresponding to the previous cycle is greater than a positive value of an absolute value of a current threshold is determined. If yes, the process goes to S220.

For other case where the difference between the present driving current and the temporary current value corresponding to the previous cycle is not greater than the positive value of the absolute value of the current threshold, it is not detailed here, but will be described in embodiments corresponding to FIGS. 3 and 4.

At S220, the current change trend is recorded as increase in current and the temporary current update count value is cleared.

In a practical application, a parameter TrendFlag may be set to record the current change trend of the present cycle. When the current change trend is increase in current, the TrendFlag is assigned a value of 1. On the contrary, when the current change trend of the present cycle is decrease in current, the TrendFlag is assigned a value of 0.

At S230, whether the current change trend of the previous cycle is increase in current is determined. If yes, the process goes to S240, else, the process goes to S250.

With reference to the representation method for the current change trend of the present cycle, the current change trend of the previous cycle may be recorded as TrendFlagLast. If the current change trend of the previous cycle is increase in current, the TrendFlagLast is assigned with a value of 1. On the contrary, if the current change trend of the previous cycle is decrease in current, the TrendFlagLast is assigned with a value of 0.

Based on this, the value of TrendFlagLast may be obtained directly in the step to determine the current change trend of the previous cycle.

At S240, an increment of the current locking accumulative count value is increased.

It should be noted that an increasing operation in this step is to increasing the increment of the current locking accumulative count value, not the current locking accumulative count value per se.

At S250, the increment of the current locking accumulative count value is set to an initial value.

The initial value may be set according to actual control requirements. For example, it may be set to 1, or it may be set to other values, which is not detailed here.

At S260, the current locking accumulative count value is increased by the increment of the current locking accumulative count value in the present cycle.

It can be seen from FIG. 2 that there are two possibilities for the increment of the current locking accumulative count value of the present cycle, one is an execution result of S240, and the other is an execution result of S250.

The execution result of S240 is used in the case where the current change trend of the previous cycle is the same as the current change trend of the present cycle. It should be understood that since the increment of the current locking accumulative count value is increased, so the current locking accumulative count value is increased rapidly after this step, which will help determination of the locking flag more quickly.

At S270, a locking current value is updated to be the present driving current.

Following the previous example, while updating the locking current value to be the present driving current, the value of TrendFlag may be assigned to the TrendFlagLast for use in a next cycle.

Figure 3:
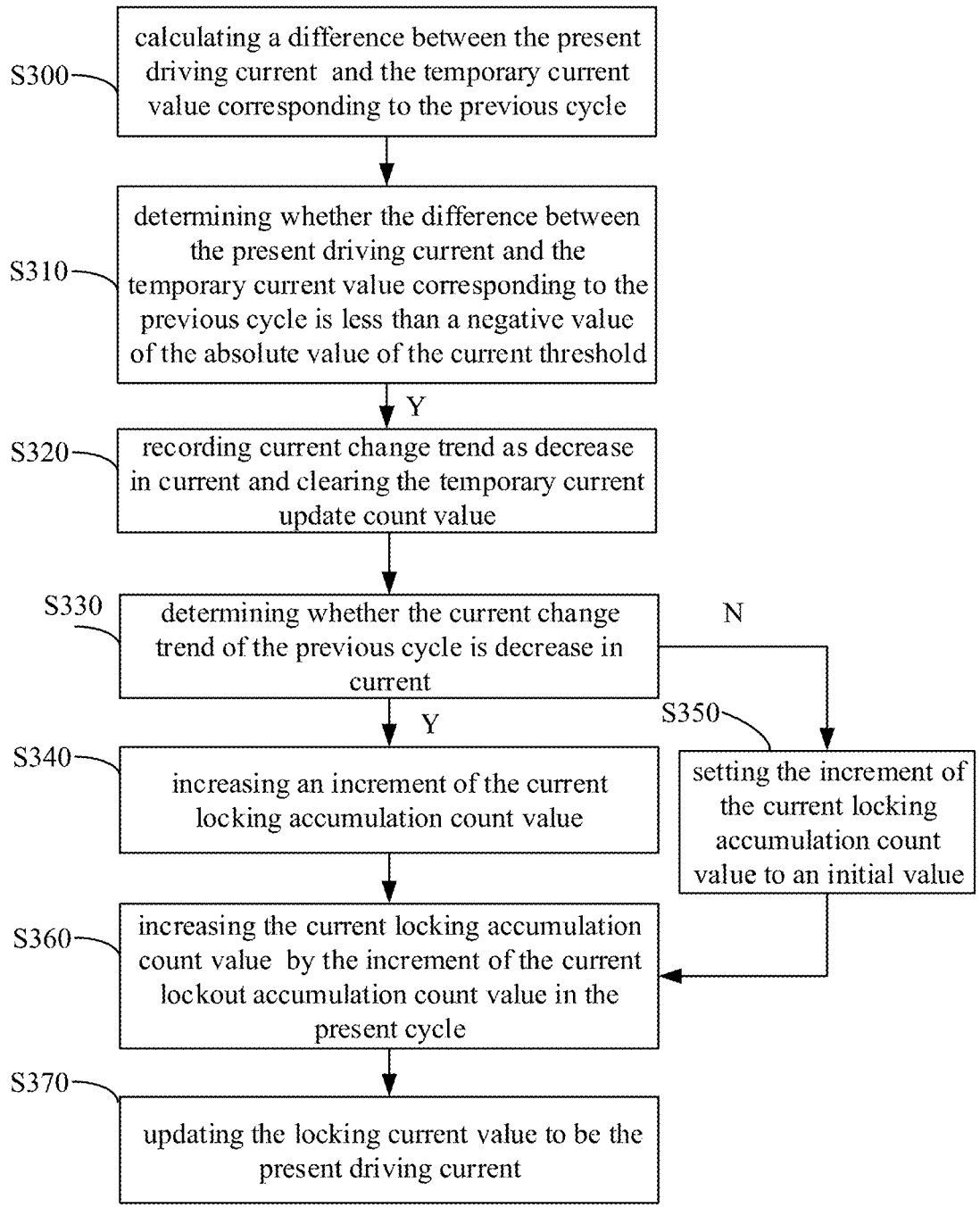
FIG. 3 is another flowchart for calculating a current locking accumulative count value according to an embodiment of the application.

Further, as shown in FIG. 3, which is another flowchart for calculating a current locking accumulative count value according to an embodiment of the application, the process includes steps S300, S310, S320, S330, S340, S350, S360 and S370.

At S300, a difference between the present driving current and the temporary current value corresponding to the previous cycle is calculated.

It should be noted that the embodiment shown in FIG. 3 can be understood as a further process procedure when the difference between the present driving current and the temporary current value is not greater than the positive value of the absolute value of the current threshold. Therefore, it may be that S300 is omitted and a calculation result of S200 is obtained directly, which is also feasible.

At S310, whether the difference between the present driving current and the temporary current value corresponding to the previous cycle is less than a negative value of the absolute value of the current threshold is determined. If yes, the process goes to S320.

For other case that the difference between the present driving current and the temporary current value is not greater than the positive value of the absolute value of the current threshold and not less than the negative value of the absolute value of the current threshold, it is not detailed here, but will be described in an embodiment corresponding to FIG. 4

At S320, the current change trend is recorded as decrease in current and the temporary current update count value is cleared.

Optionally, following the previous example, the TrendFlag which represents the current change trend is assigned with a value of 0, and meanwhile, the temporary current update count value is cleared.

At S330, whether the current change trend of the previous cycle is decrease in current is determined. If yes, the process goes to S340, else, the process goes to S350.

With reference to the representation method for the current change trend of the present cycle, the current change trend of the previous cycle may be recorded as TrendFlagLast. If the current change trend of the previous cycle is increase in current, the TrendFlagLast is assigned with a value of 1. On the contrary, if the current change trend of the previous cycle is decrease in current, the TrendFlagLast is assigned with a value of 0.

Based on this, the value of TrendFlagLast may be obtained directly in the step to determine the current change trend of the previous cycle.

At S340, an increment of the current locking accumulative count value is increased.

It should be noted that an accumulation operation in this step is to increase the increment of the current locking accumulative count value, not the current locking accumulative count value per se.

At S350, the increment of the current locking accumulative count value is set to be an initial value.

It should be noted that, unlike the embodiment shown in FIG. 2, in a case where the difference between the present driving current and the temporary current value corresponding to the previous cycle is less than the negative value of the absolute value of the current threshold, if the current change trend of the previous cycle is different from the current change trend of the present cycle, the initial value may be greater than the increment used for increasing of the current locking accumulative count value. The reason is that, in a practical application, there may be some special points in the travel of the seat, such as deformation points on a guide rail, or foreign objects falling on the guide rail. When the seat moves to one of such special points, the driving current will suddenly increase, and then quickly fall back, that is, the current change trend of the previous cycle is increase in current and the current change trend of the present cycle is decrease in current. In order to avoid an influence of this situation on a final detection result, it is necessary to quickly reduce the current locking accumulation count when such a situation occurs. Therefore, a greater initial value may be used to rapidly reduce the current locking accumulation count to avoid affecting a subsequent determination result.

At S360, the current locking accumulative count value is increased by the increment of the current locking accumulative count value in the present cycle.

The optional implementation of S360 may be similar with that of S260, and will not be repeated here.

At S370, a locking current value is updated to be the present driving current.

Following the previous example, while updating the locking current value to be the present driving current, the value of TrendFlag may be assigned to the TrendFlagLast for use in a next cycle.

Figure 4:
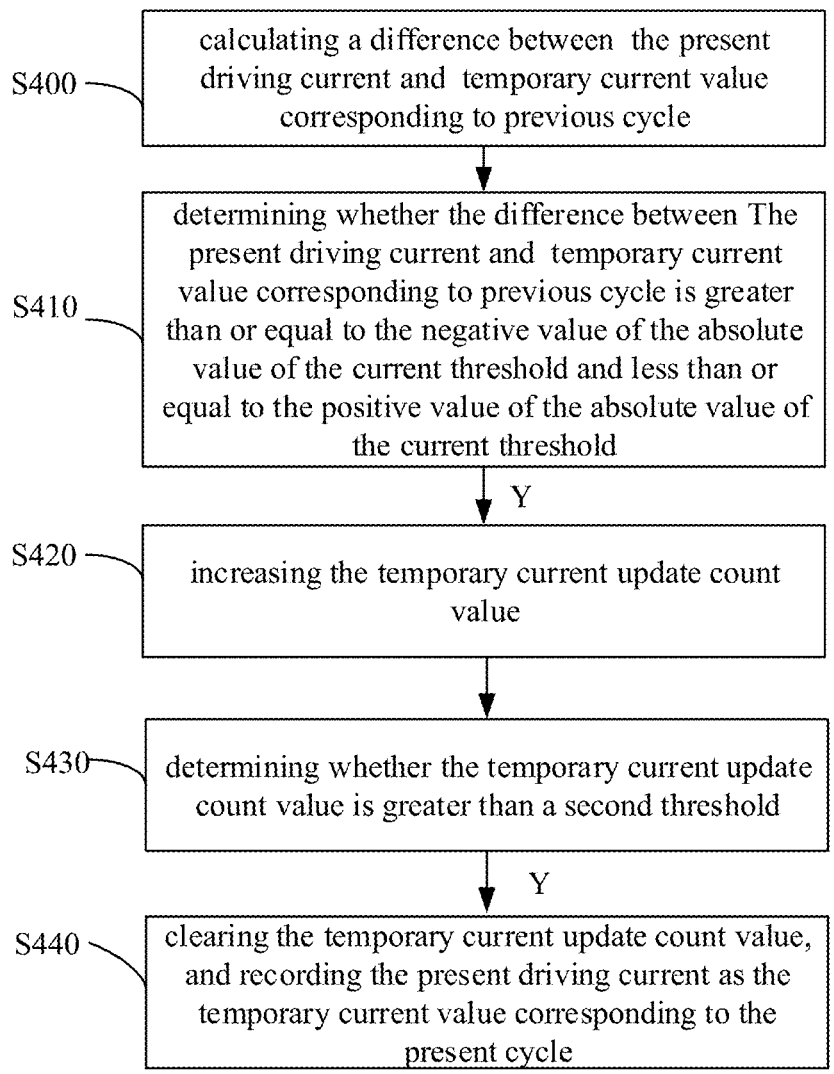
FIG. 4 is a flowchart for updating a temporary current value according to an embodiment of the application.

Further, on the basis of the previous embodiments, referring to the embodiment shown in FIG. 4, the embodiment provides a process of updating the temporary current value. As shown in FIG. 4, the process of updating the temporary current value may include steps: S400, S410, S420, S430 and S440.

At S400, a difference between the present driving current and the temporary current value corresponding to the previous cycle is calculated.

Similar to the embodiment shown in FIG. 3, S400 in the embodiment can also be understood as a further process procedure when the difference between the present driving current and the temporary current value corresponding to the previous cycle is not greater than the positive value of the absolute value of the current threshold. Therefore, it may be that S400 is omitted and a calculation result of S200 is obtained directly, which is also feasible.

At S410, whether the difference between the present driving current and the temporary current value corresponding to the previous cycle is greater than or equal to the negative value of the absolute value of the current threshold and less than or equal to the positive value of the absolute value of the current threshold is determined. If yes, the process goes to S420.

For the case where the difference between present the driving current and the temporary current value is less than the negative value of the absolute value of the current threshold and the case where the difference between the present driving current and the temporary current value is greater than the positive value of the absolute value of the current threshold, previous embodiments may be referred for details, and the details will not be repeated here.

At S420, the temporary current update count value is increased.

When the difference between the present driving current and the temporary current value corresponding to the previous cycle is greater than or equal to the negative value of the absolute value of the current threshold and less than or equal to the positive value of the absolute value of the current threshold, that is, when the present driving current has not been changed significantly, the temporary current update count value is increased to increase the temporary current update count value. Of course, in a practical application, an increment for each increase of the temporary current update count may be flexibly selected, for example, it may be 1, that is, the temporary current update count value increases by 1 after each accumulation.

Optionally, in a practical application, a field may be specially configured to store the temporary current update count value. A value in the field may be increased or reset according to a specific situation of the above discussed determination process. Of course, any other method may be used to perform statistics on an accumulative duration during which the temporary current value is not updated, without departing from the scope of the core idea of the application and still falling within the scope of protection of the application.

At S430, whether the temporary current update count value is greater than a second threshold is determined. If yes, the process goes to S440.

As previously mentioned, the temporary current update count value is used to represent a duration in which the temporary current value is not updated. Based on this, the second threshold corresponds to a duration threshold in which the temporary current value is not updated continuously. In a practical application, a specific value of the second threshold may be determined based on sensitivity requirements of an anti-pinch detection and specific conditions of the electric seat control system, and thus is not specifically limited in the application.

It should be noted that if it is determined that the temporary current update count value is not greater than the second threshold in any cycle, the execution of the embodiment shown in FIG. 4 is exited.

S440, the temporary current update count value is cleared, and the present driving current is recorded as the temporary current value corresponding to the present cycle.

If the temporary current update count value is greater than the second threshold, it indicates that the temporary current value has not been updated for a long time. To avoid affecting accuracy of a next cycle's detection, the temporary current update count value is cleared and the temporary current value is updated to be the present driving current.

The advantage of the embodiment shown in FIG. 4 is that, in a practical application, the guide rail for the seat may have a certain inclination, which leads to the driving current being continuously increased even if no anti-pinch event occurs. In order to avoid false determination of an anti-pinch event, it is necessary to update the temporary current value in time, to ensure that the difference between the present driving current and the temporary current corresponding to any cycle under this condition is greater than or equal to the negative value of the absolute value of the current threshold and less than or equal to the positive value of the absolute value of the current threshold, so as to avoid occurrence of false identification of an anti-pinch event.

At S130, a locking flag is determined according to a magnitude relationship between the current locking accumulative count value and the first threshold.

Figure 5:
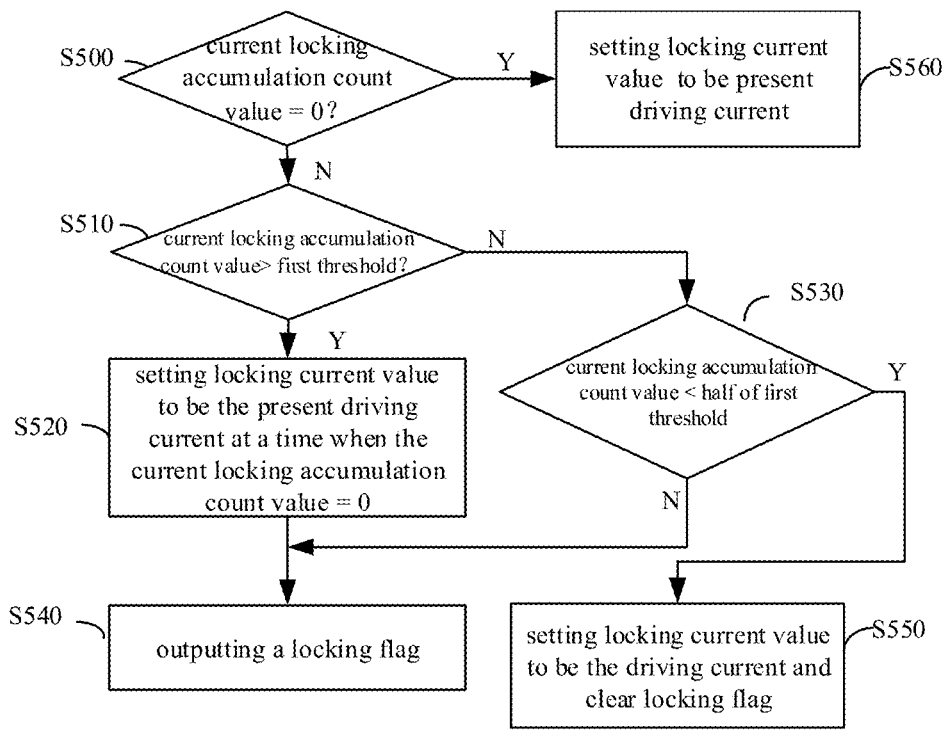
FIG. 5 is a flowchart for determining a locking flag according to an embodiment of the application.

Optionally, an optional implementation of this step is shown in FIG. 5, which is a flowchart for determining a locking flag according to an embodiment of the application. The process for determining the locking flag may include steps: S500, S510, S520, S530, S540, S550, and S560.

At S500, whether the current locking accumulative count value is equal to 0 is determined. If yes, the process goes to S560, else, the process goes to S510.

In a practical application, an initial value of the current locking cumulative count is 0. According to the above descriptions, only when the difference between the present driving current and the locking current value is greater than the positive value of the absolute value of the current threshold, an increasing operation is performed to make it change from 0 to a non-zero value. Therefore, in any cycle, whether the current locking cumulative value is 0 is determined, and if it is not 0, it indicates that the current locking accumulative count value has been increased, and execution of S510 is further required.

At S510, whether the current locking accumulative count value is greater than the first threshold is determined. If yes, the process goes to S520, else, the process goes to S530.

Optionally, the first threshold for the present cycle may be obtained by looking up a threshold table according to a motor position, a movement direction and a working voltage of the seat motor in the present cycle.

The threshold table described in the embodiment may be obtained through calibration according to characteristics of a real seat motor. During the calibration, different thresholds may be calibrated according to different characteristics of the real seat motor. The characteristics of the real seat motor may include a motor position, a motor command and a working voltage. Specifically, the motor position may be determined according to a Hall count. Of course, the motor position may be understood as a position of the seat, and the motor command and working voltage may be obtained by any other control algorithm in existing arts. More importantly, the motor command should further include a movement direction of the motor.

At S520, the locking current value is set to be the present driving current at a time when the current locking accumulative count value is 0.

If the current locking accumulative count value is greater than the first threshold, the present driving current at a time when the current locking accumulative count value is 0 is taken as the locking current value.

In a practical application, a locking current field may be set separately. In each control cycle, whether the current locking accumulative count value is 0 is determined. If not, the locking current value in the locking current field is maintained unchanged. In this way, as long as the difference between the present driving current and the locking current value in any cycle is greater than the positive value of the absolute value of the current threshold, the current locking accumulative count value will increase to avoid updating the locking current value in the locking current field, and the locking current value in the locking current field can be directly read out when this step is performed.

At S530, whether the current locking accumulative count value is less than half of the first threshold is determined. If not, the process goes to S540, else, the process goes to S550. It can be known from a practical application that an obstacle in the movement direction of the seat may be removed in time. In this case, the driving current of the seat motor will continue to decrease. According to the above discussed processes, the current locking accumulative count value will also continue to decrease. Based on this, the embodiment of the application provides this step such that if the current locking accumulative count value is not less than half of the first threshold, the locking flag should not be cleared, but execution of S540 is required. On the contrary, if the current locking accumulative count value is less than half of the first threshold, S550 is executed.

At S540, a locking flag is output.

Optionally, a locking flag ApOORFlag may be set. Outputting the locking flag is to set the ApOORFlag to 1, and accordingly, clearing the locking flag is to set the ApOORFlag to 0.

At S550, the locking current value is set to be the present driving current, and the locking flag is cleared.

If the obstacle has been removed at this time, the driving current will gradually decrease, then taking the present driving current as the locking current value for a further determination in a subsequent cycle may enable the locking current to be less than the anti-pinch judgment threshold as soon as possible, and thus detection of an anti-pinch event can be released as soon as possible.

Further, as shown in FIG. 5, this method outputs the locking flag in a case where the current locking accumulative count value is greater than the first threshold, and clears the locking flag in a case where the current locking accumulative count value is less than half of the first threshold. A range between half of the first threshold and the first threshold may be understood as a buffer range, which avoids frequent switching of the locking current value and helps improvement of stability of the anti-pinch detection method.

At S560, the locking current value is set to be the present driving current of the present cycle.

If S500 determines that the current locking accumulative count value is equal to 0, it indicates that the driving current has not changed greatly, and then the locking current value is set to be the present driving current of the present cycle. It can be seen from the above descriptions that the locking current value will be continuously updated when the driving current does not change greatly, and once the current locking accumulative count value is not 0, updating of the locking current value will be stopped, so as to ensure that an accurate locking current value is obtained.

To sum up, in the seat control method provided by the application, in an event of an anti-pinch event, the driving current will continue to increase. In the application, when the current change trend of the previous cycle is the same as the current change trend of the present cycle, an increment of the current locking accumulative count value will increase, such that a locking flag for stopping the seat motor can be more quickly determined so as to achieve an anti-pinch function, Thus, the anti-pinch event can be detected quickly and accurately.

Furthermore, when the driving current continues to increase, the current locking accumulative count value increases rapidly by an increasing increment of the current locking accumulative count value, so that the locking current can be determined quickly, and then whether an anti-pinch event is occurred can be determined more quickly, which can significantly improve efficiency of the anti-pinch detection and further improve safety in use of the vehicle.

Figure 6:
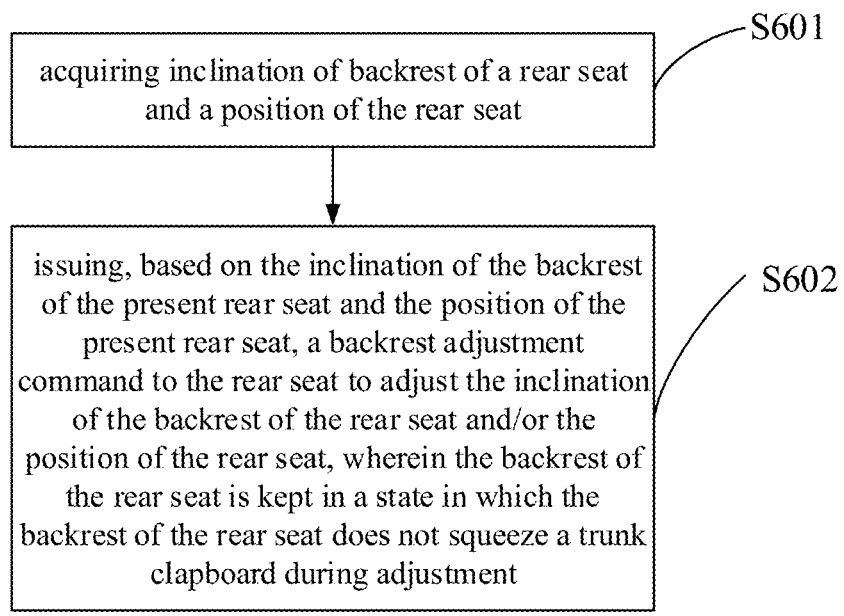
FIG. 6 is a second flowchart of a seat control method according to an embodiment of the application.

Generally, posture of a front seat in an existing vehicle can be adjusted freely, while posture of a rear seat of the vehicle is fixed and cannot be adjusted. Therefore, a passenger sitting on the rear seat for a long time will easily feel tired. However, the passenger siting on a rear seat is often a noble passenger or a passenger with special needs, such as a leader and the elderly, which have a higher demand for an adjustable rear seat. Based on this, the seat control method according to the embodiments of the application may further include steps: S601 and S602, as shown in FIG. 6.

At Step S601, inclination of backrest of a rear seat and a position of the rear seat are acquired.

In a practical application, a guide rail is fixed below the rear seat, and the whole length of the guide rail is regarded as 100%. The position of the rear seat, as determined by the seat controller, is a position of the rear seat in the guide rail.

At Step S602, based on the inclination of the backrest of the rear seat and the position of the rear seat, a backrest adjustment command is issued to the rear seat to adjust the inclination of the backrest of the rear seat and/or the position of the rear seat, wherein the backrest of the rear seat is kept in a state in which backrest does not squeeze a trunk clapboard of the vehicle during adjustment.

The adjustment of inclination of the backrest of the rear seat or the adjustment of the position of the rear seat may be adjustment forward or adjustment backward. The adjustment forward refers to adjustment towards the front of the vehicle, and the adjustment backward refers to adjustment towards the rear of the vehicle.

In the embodiment, the inclination of the backrest of the rear seat and the position of the rear seat may be adjusted in linkage according to a pre-calibrated relation curve between inclinations of backrest of a rear seat and positions of the rear seat in a case where the backrest of the rear seat is immediately close to the trunk clapboard of the vehicle.

Figure 7:
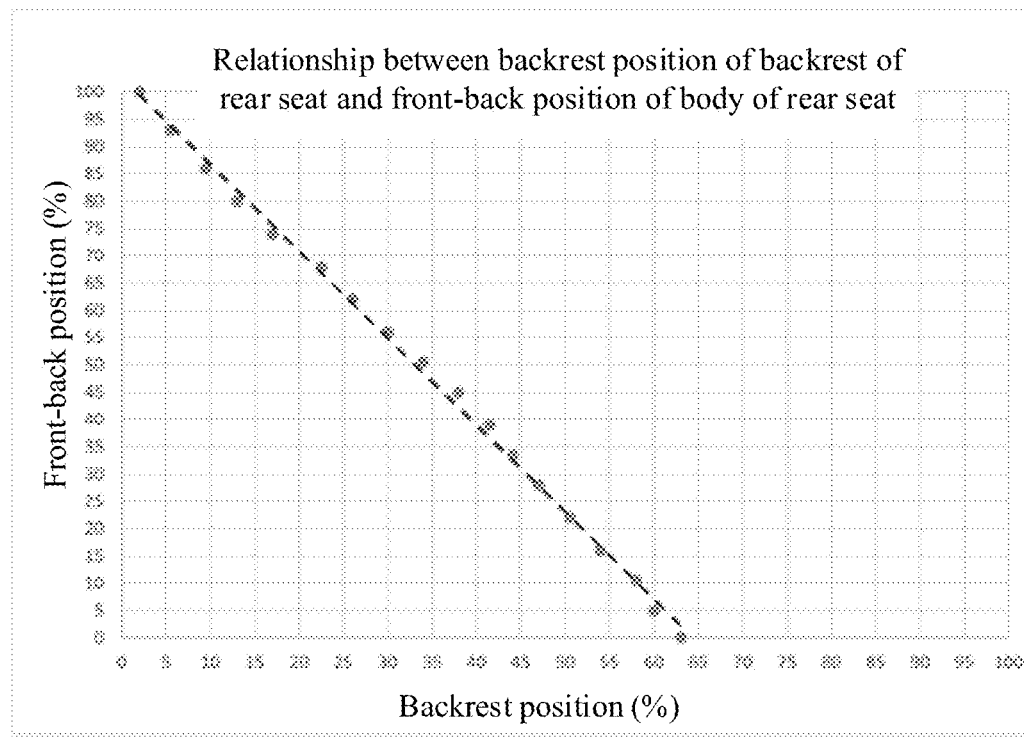
FIG. 7 is a schematic diagram illustrating a relationship between a front-back position of a rear seat and a position of backrest of the rear seat according to an embodiment of the application.

In the embodiment, each position of the backrest of the rear seat when it is immediately close to the trunk clapboard corresponds to a front-back position of the rear seat, as shown in FIG. 7. As long as a relationship between the front-back position of the rear seat (i.e. the inclination of the backrest of the rear seat) and the position of the rear seat is conformity with a correspondence relationship as shown in FIG. 7, the backrest of the backrest of the rear seat being immediately close to the trunk clapboard can be achieved.

Figure 8:
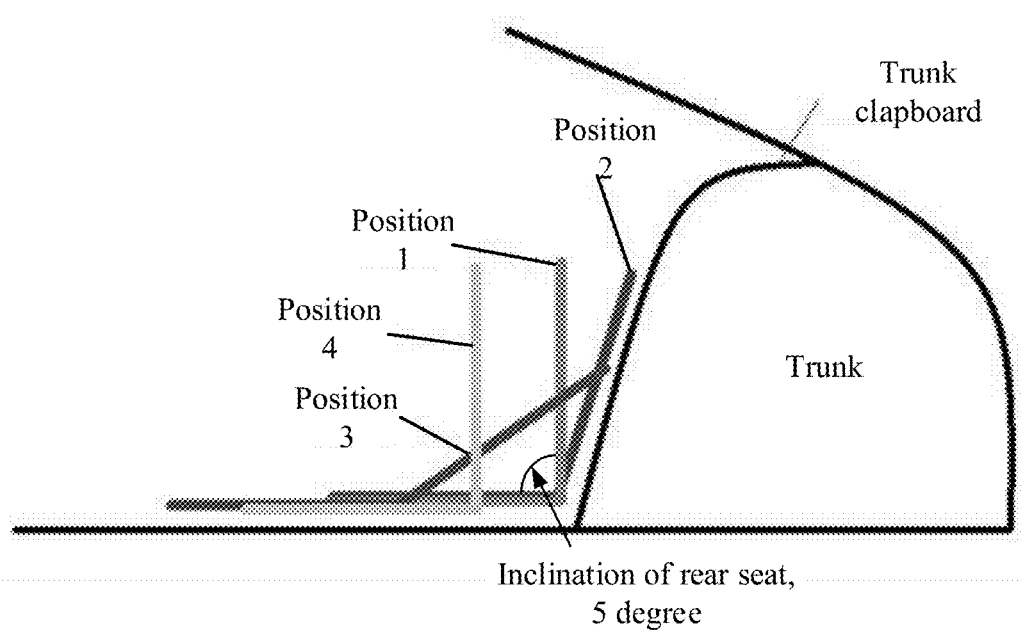
FIG. 8 is a schematic diagram illustrating a spatial relationship of front-back adjustment of a rear seat and adjustment of backrest of the rear seat in linkage adjustment according to an embodiment of the application.

As shown in FIG. 8, it is a schematic diagram illustrating a spatial relationship between front-back adjustment of a rear seat and adjustment of backrest of the rear seat in linkage adjustment according to an embodiment of the application. For a rear seat, when the backrest of the rear seat at a position 2 is desired to be adjusted backward, in order to prevent the backrest of the rear seat from squeezing the trunk clapboard, the rear seat should be integrally moved forward to leave an enough space for the backrest of the rear seat to be adjustable. Based on this, in the application, adjustment of the front-back position of the rear seat and adjustment of the backrest of the rear seat are linked together. When the backrest of the rear seat is adjusted backward (forward), the rear seat is integrally adjusted forward (backward).

To sum up, the seat controller acquires the inclination of the backrest of a rear seat and the position of the rear seat, and issues, based on the inclination of the backrest of the rear seat and the position of the rear seat, a backrest adjustment command to the rear seat to adjust the inclination of the backrest of the rear seat and/or the position of the rear seat, wherein the backrest of the rear seat is still in a state in which it does non squeeze the trunk clapboard during adjustment. In a case where the backrest of the rear seat is immediately close to the trunk clapboard, the inclination of the backrest of the rear seat and the position of the rear seat may be adjusted in linkage in accordance with a pre-calibrated relation curve between inclinations of backrest of a rear seat and positions of the rear seat. The linked adjustment of the inclination of the backrest of the rear seat and the position of the rear seat in the application keeps the backrest of the rear seat to be immediately close to the trunk clapboard in real time, which is relatively beautiful and can prevent an object from falling into a gap between the backrest of the rear seat and the trunk clapboard.

As shown in FIG. 8, when the rear seat is adjusted between a position 2 and a position 3, the backrest of the rear seat is immediately close to the trunk clapboard in real time, to prevent an object from falling into a gap between the backrest of the rear seat and the trunk clapboard and to prevent the backrest of the rear seat from squeezing the trunk clapboard. In an existing solution, an adjustment speed for a front seat is generally fixed. However, if an adjustment speed of the adjustment of the front-back position of the rear seat and an adjustment speed of the adjustment of the backrest of the rear seat are not adjustable, it will not meet the requirement of the backrest of the backrest of the rear seat being immediately close to the trunk clapboard in real time. Therefore, at least one of an adjustment speed of the adjustment of the front-back position of the rear seat and an adjustment speed of the adjustment of the backrest of the rear seat is adjustable. Based on this, a seat for which a speed of front-back adjustment by the motor is controllable is used as the rear seat in the application. In order to ensure the backrest of the rear seat is immediately close to the trunk clapboard during adjustment, the position of the backrest of the rear seat needs to be adjusted back and forth to achieve different movements of the backrest of the rear seat. During the whole adjustment process of the rear seat, it requires the front-back adjustment to be moved according to a certain speed curve in order to keep the backrest of the rear seat immediately close to the trunk clapboard. In order to avoid the adjustment speed from being greatly affected by a power supply voltage, load of the seat or the like and in order to reduce control complexity, a virtual function module, i.e. a proportional integral (proportional-integral, PI) controller, may be used in the seat controller in the application to take the front-back position of the rear seat as a control target and take a duty cycle of a pulse width modulation (Pulse Width Modulation, PWM) driven by the motor as control variable to achieve a closed-loop control of the speed of the front-back adjustment of the rear seat, which can effectively reduce control complexity and simplify a calibration process. Even if this method is applied in a situation with a different power supply voltage and different load of the seat, accuracy of adjustment of the position of the rear seat will not be affected by a change in a movement speed of the backrest of the rear seat, and thus effects of adjustment of the rear seat is optimized.

In the embodiment, in the case where the backrest of the rear seat is immediately close to the trunk clapboard, a space in which the inclination of the backrest of the rear seat and the position of the rear seat are adjustable in linkage is a linkage area.

An adjustable space, associated with the backrest of the rear seat and the position of the rear seat, outside the linkage area is a non-linkage area.

In the non-linkage area, the inclination of the backrest of the rear seat may be freely adjustable within a first inclination adjustment range with respect to the position of the rear seat, and the position of the rear seat may be freely adjustable within a first position adjustment range along an extension direction of a body of a vehicle with respect to the inclination of the backrest of the rear seat.

Within the first inclination adjustment range and the first position adjustment range, the backrest of the rear seat is kept in the state in which the backrest of the rear seat does not squeeze the trunk clapboard.

Figure 9:
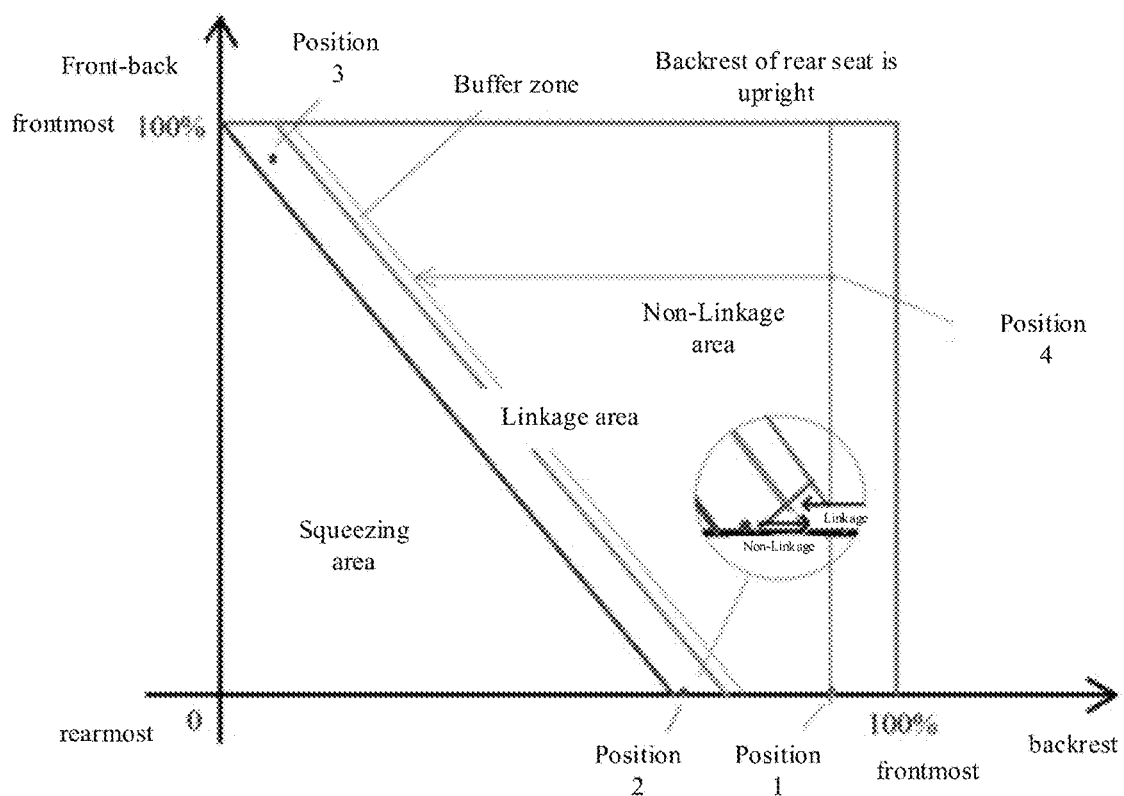
FIG. 9 is a schematic diagram illustrating spatial partitions for cooperative adjustment of front-back adjustment of a rear seat and adjustment of backrest of the rear seat according to an embodiment of the application.

As shown in FIG. 9, it is a schematic diagram illustrating spatial partitions for cooperative adjustment of adjustment of backrest of a rear seat and front-back adjustment of the rear seat according to an embodiment of the application. An adjustable space associated with the inclination of the backrest of the rear seat and the position of the rear seat is divided into the non-linkage area and the linkage area depending on whether the backrest of the rear seat being immediately closely to the trunk clapboard. It can be seen from FIG. 9 that the non-linkage area is a plane and trapezoidal area, and with different inclination, a front-back adjustment range is different, and with a different front-back position, an inclination adjustment range is different. For example, the first inclination adjustment range and the first position adjustment range are within the non-linkage area.

It should be noted that the inclination (5 degrees) of the backrest of the rear seat in the embodiment of the present disclosure refers to the backrest of the rear seat is inclined with respect to a plane where the seat is located is 5 degrees, as shown in FIG. 8, wherein an opening of the angle faces toward a head of the vehicle.

As shown in FIG. 8 and FIG. 9, when the rear seat is located at a position 1 or a position 4, adjustment of the rear seat will not cause the backrest of the rear seat to squeeze the trunk clapboard due to its mechanical front-back position of the rear seat and position of the backrest of the rear seat. At this point, the backrest of the rear seat can be freely adjusted forward and backward while the rear seat is being freely adjusted in the horizontal direction. The positions are within a non-linkage area.

FIG. 9 also shows a squeezing area, in which both the rear seat and the backrest of the rear seat squeeze the trunk clapboard. Therefore, under a normal circumstance, the position of the rear seat will not reach this area.

When the rear seat is located at a position 2 or a position 3, the top of the backrest of the rear seat is immediately close to the trunk clapboard, so the positions are within a linkage area.

In the embodiment of the application, the backrest adjustment command issued to the rear seat may include: a command to adjust the inclination of the backrest of the rear seat and a command to adjust the position of the rear seat.

In the linkage area, the command to adjust the inclination of the backrest of the rear seat and the command to adjust the position of the rear seat are combined into a combined adjustment command.

In the linkage area, the command to adjust the inclination of the backrest of the rear seat and the command to adjust the position of the rear seat are combined into one single command, which is recorded as a combined adjustment command. See Table 1 for a combination mode of the command to adjust the inclination of the backrest of the rear seat and the command to adjust the position of the rear seat.

TABLE 1

| Front-back command | Backrest command | | |
|---|---|---|---|
| | Backrest stopped | Backrest frontward | Backrest backward |
| Front-back stopped | No valid command Backrest is stopped, Front-back movement of the seat is stopped | Linkage adjustment: Backrest is adjusted frontward, Front-back position is adjusted backward | Linkage adjustment: Backrest is adjusted backward, Front-back position is adjusted backward |
| Front-back frontward | Linkage adjustment: Backrest is adjusted backward, Front-back position is adjusted frontward | Linkage adjustment exits: Backrest is adjusted frontward, Front-back position is adjusted frontward | Linkage adjustment: Backrest is adjusted backward, Front-back position is adjusted frontward |
| Front-back backward | Linkage adjustment: Backrest is adjusted frontward, Front-back position is adjusted backward | Linkage adjustment: Backrest is adjusted frontward, Front-back position is adjusted backward | In order to avoid sneezing trunk clapboard: Backrest is stopped, Front-back movement of the seat is stopped |

In Table 1, when the inclination of the backrest of the rear seat is adjusted, the position of the rear seat is adjusted in linkage. Similarly, when the position of the rear seat is adjusted, the inclination of the backrest of the rear seat is adjusted in linkage. In Table 1, the backrest command is the command to adjust the inclination of the backrest of the rear seat, and the front-back commands is the command to adjust the position of the rear seat.

It should be noted that the position of the rear seat being adjusted backward indicates adjustment of the position towards the rear of the vehicle. The position of the rear seat being adjusted frontward indicates adjustment of the position further away from the rear of the vehicle. The inclination of the backrest of the rear seat being adjusted backward refers to adjustment of the inclination of the backrest of the rear seat to make the inclination larger, while the inclination of the backrest of the rear seat being adjusted frontward refers to adjustment of the inclination of the backrest of the rear seat to make the inclination smaller.

It can be seen from Table 1 that the combined adjustment command may include a command to:
 stop adjustment of the inclination of the backrest of the rear seat, and stop adjustment of the front-back position of the rear seat; or,
 adjust the inclination of the backrest of rear seat to make the inclination smaller (that is, forward adjustment), and adjust the position of the rear seat to make the position closer to rear of the vehicle (that is, backward adjustment); or,
 adjust the inclination of the back of rear seat to make the inclination greater (that is, that is, backward adjustment), and adjust the position of the rear seat to make the position closer to the rear of the vehicle; or,
 adjust the inclination of the back of rear seat to make the inclination smaller, and adjust the position of the rear seat to make the position further away from the rear of the vehicle (that is, forward adjustment).

For example, in an embodiment, in the non-linkage area, the command to adjust the inclination of the backrest of the rear seat and the command to adjust the position of the rear seat may be executed independently.

For example, in an embodiment, the command to adjust the inclination of the backrest of the rear seat is used to control movement of a first motor which is provided to adjust the inclination of the backrest of the rear seat, and the command to adjust the position of the rear seat is used to control movement of a second motor which is provided to adjust the position of the rear seat.

During adjustment of the rear seat, a dynamic adjustment from the linkage area to the non-linkage area may be realized, and a dynamic adjustment from the non-linkage area to the linkage area may also be realized.

For example, in an embodiment, during adjustment of the inclination of the backrest of the rear seat and the position of the rear seat within the non-linkage area, the inclination of the backrest of the rear seat is adjusted to make the inclination greater in response to the command to adjust inclination of the backrest of the rear seat contained in a command to adjust the backrest of the rear seat, such that an adjustable space associated with the inclination of the backrest of the rear seat and the position of the rear seat is switched from the non-linkage area to the linkage area.

The command to adjust the inclination of the backrest of the rear seat and the command to adjust the position of the rear seat are combined into the combined adjustment command, and the combined adjustment command is executed to perform adjustment of the inclination of the backrest of the rear seat and adjustment of the position of the rear seat in linkage.

For example, the second motor may be started before the switching to the linkage area.

For example, in an embodiment, during adjustment of the inclination of the backrest of the rear seat and the position of the rear seat within the linkage area, the inclination of the backrest of the rear seat is adjusted to make the inclination smaller in response to the combined adjustment command, such that an adjustable space associated with the inclination of the backrest of the rear seat and the position of the rear seat is switched from the linkage area to the non-linkage area. The combined adjustment command is switched to the command to adjust the backrest of the rear seat, and adjustment of the position of the rear seat is stopped.

For example, the command to adjust the backrest of the rear seat indicates adjustment of the inclination of the backrest of the rear seat to make the inclination smaller.

For example, in an embodiment, when the command to adjust the backrest of the rear seat and the command to adjust the rear seat are both valid, in a case where the direction of adjustment of the position of the rear seat and the direction of adjustment of the inclination of the backrest of the rear seat are both consistent with a direction of a linkage adjustment, then the adjustments are performed according to the combined adjustment command; and in a case where the direction of adjustment of the position of the rear seat and the direction of adjustment of the inclination of the backrest of the rear seat are not consistent with the direction of the linkage adjustment, if the position of the rear seat and the inclination of the backrest of the rear seat are both adjusted backward, the adjustments will be stopped, and if the position of the rear seat and the inclination of the backrest of the rear seat are both adjusted forward, then the non-linkage area is entered.

The commands in the non-linkage area are independent. At this time, the command to adjust the front-back position of the rear seat and the command to adjust the backrest of the rear seat controls movement of motors configured to perform the respective commands.

Therefore, attention should be paid to the following situations during transition between the linkage area and the non-linkage area:

Situation 1. In a process of transition from the non-linkage area to the linkage area during adjustment of the position of the rear seat and the inclination of the rear seat back (taking the position 4 in FIG. 3 as an example, adjustment of the inclination of the backrest of the rear seat backward causes a transition to the linkage area), the command to adjust the backrest of the rear seat is switched from driving only a motor corresponding to adjustment of the inclination of the backrest of the rear seat to simultaneously driving the motor corresponding to adjustment of the inclination of the backrest of the rear seat and a motor corresponding to adjustment of the position of the rear seat. Since starting of the motor corresponding to the adjustment of the position of the rear seat may affect accuracy of the position, the motor corresponding to the adjustment of the position of the rear seat should be started before the transition to the linkage area, so as to reserve a buffer zone of one position interval to avoid squeezing the trunk clapboard.

Situation 2. In a process of transition from the linkage area to the non-linkage area during adjustment of the position of the rear seat and the inclination of the rear seat back (taking the position 2 in FIG. 3 as an example, adjustment of the inclination of the backrest of the rear seat frontward causes a transition to the non-linkage area), the command to adjust the backrest of the rear seat is switched from simultaneously driving the motor corresponding to adjustment of the inclination of the backrest of the rear seat and a motor corresponding to adjustment of the position of the rear seat to stopping driving of the motor corresponding to adjustment of the position of the rear seat, and driving only a motor corresponding to adjustment of the inclination of the backrest of the rear seat to adjustment of the inclination of the backrest of the rear seat frontward. In order to prevent the seat controller still sending to the motor corresponding to the adjustment of the position of the rear sea a front-back adjustment command when the rear seat is at the rearmost end, it is necessary to perform a preset process on the rear seat when the rear seat reaches the rearmost end to make adjustment of the position of the rear seat to be performed directly out of the linkage area. As for the case where adjustment of the backrest of the rear seat backward merely when the rear seat is at the rearmost end to make a transition to the linkage area, it is the same as a case where the rear seat is located any other position, and the front-back adjustment is started upon entering into the buffer zone.

Situation 3. In order to cope with some special circumstances, such as when a mobile phone or any other small object falls behind the seat, the application supports a multi-button pressing operation. When a button for adjusting the front-back position forward and a button for adjusting the backrest forward are pressed at the same time, the position of the rear seat and the inclination of the backrest of the rear seat are adjusted forward at the same time to quickly exit the linkage area so as to facilitate pickup of the fallen object or cleaning after the backrest leaves further away from trunk clapboard.

It should be noted that the inclination of the backrest of the rear seat and the position of the rear seat are adjusted in the linkage area.

For example, in some embodiments, when the position of the rear seat reaches a position closest to the rear of the vehicle, the inclination of the backrest of the rear seat and the position of the rear seat are adjusted by directly switching out of the linkage area.

In the application, adjustment of the position of the rear seat may include: adjusting the position of the rear seat at an adjustable speed by using a proportional integral control module with a duty cycle of PWM driven by the second motor as a control variable.

Specifically, a subtraction operation is performed on and the position of the rear seat and a target position after adjustment. In a case where the position of the rear seat is adjusted further away from the rear of the vehicle, the position of the rear seat is subtracted from the target position, or in a case where the position of the rear seat is adjusted to closer to the rear of the vehicle, the target position is subtracted from the position of the rear seat.

In a case where a result of the subtraction operation is a positive value, the positive value is inputted to an adjuster of the proportional integral control module to increase a speed of adjustment of the position of the rear seat, or in a case where the result of the subtraction operation is a negative value, the negative value is inputted to the adjuster of the proportional integral control module to reduce the speed of adjustment of the position of the rear seat.

Therefore, in a practical application, the speed of adjustment of the position of the rear seat position may be adjusted according to a front-back position difference between the position of the rear seat and the target position of the rear seat.

For example, in an embodiment, a front-back position difference for the position of the rear seat at a previous time before the current time is obtained; whether the front-back position difference for the position of the rear seat at the current time is smaller or greater than the front-back position difference for the position of the rear seat at the previous time is determined; and if the front-back position difference for the position of the rear seat at the current time is greater than the front-back position difference for the position of the rear seat at the previous time, the speed of adjustment of the position of the rear seat is increased.

If the front-back position difference for the position of the rear seat at the current time is smaller than the front-back position difference for the position of the rear seat at the previous time, the speed of adjustment of the position of the rear seat is reduced.

In a practical application, when the front-back position difference for the position of the rear seat at the current time is greater than the front-back position difference for the position of the rear seat at the previous time, it indicates that a difference between the position of the rear seat and the target front-back position increases due to an influence of load of the vehicle or the like, and at this point, the PI controller in the seat controller will increase an output power of a vehicle motor by increasing an PWM output, so as to increase the speed of adjustment of the position of the rear seat. On the contrary, when the front-back position difference for the position of the rear seat at the current time is smaller than the front-back position difference for the position of the rear seat at the previous time, it indicates that a difference between the position of the rear seat and the target front-back position decreases, and at this point, the PI controller in the seat controller will decrease an output power of the vehicle motor by decreasing an PWM output, so as to reduce the speed of adjustment of the position of the rear seat.

In the application, the speed of the adjustment of the position of the rear seat is controlled by comparing in real time the front-back position difference for the position of the rear seat at the current time with the front-back position difference for the position of the rear seat at the previous time, so as to realize a closed loop control of the position of the rear seat.

In a practical application, it is usually necessary to limit the duty cycle of the PWM to an effective adjustment range. For this purpose, it is necessary to set key parameters of the PI adjuster according to an overall response of the vehicle system. The key parameters may include: a proportional coefficient P, an integral coefficient I and an initial integral value R of the PI adjuster.

Figure 10:
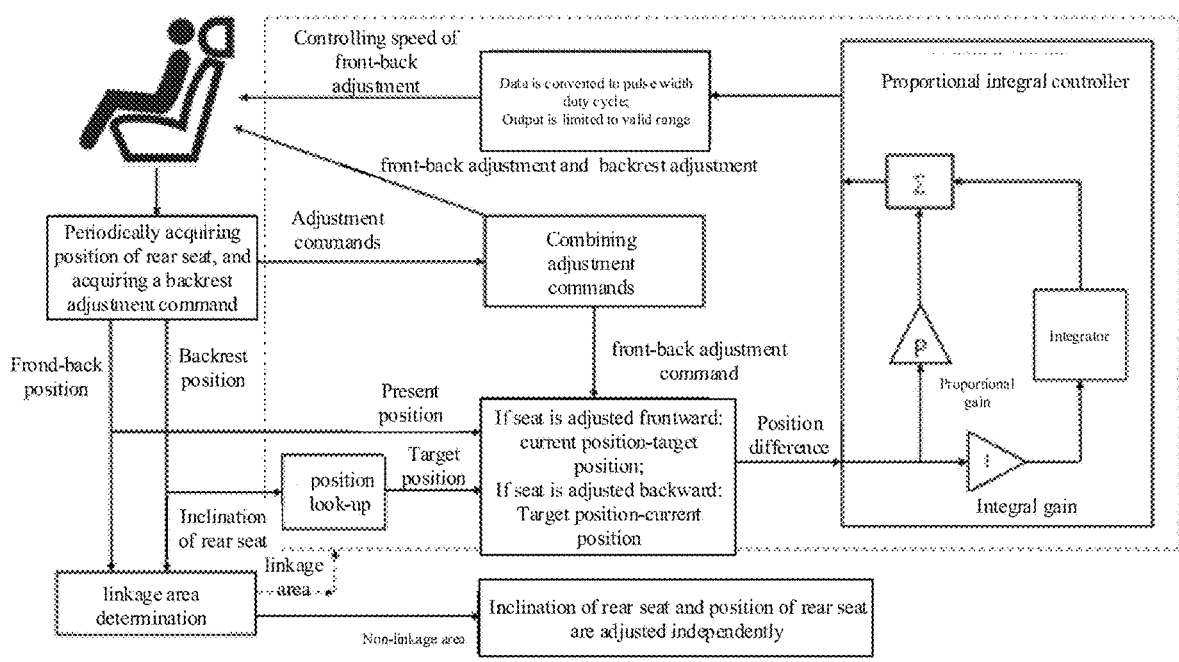
FIG. 10 is a schematic diagram illustrating a process of adjusting a rear seat of a vehicle according to an embodiment of the application.

In order for further understanding of the process of adjustment of a rear seat in a vehicle in the application, FIG. 10 illustrates a process for adjustment of a rear seat of a vehicle. First, the seat controller periodically acquires the position of the rear seat (including the inclination of the backrest of the rear seat and the position of the rear seat). Then, an area where the rear seat is located is determined according to the inclination of the backrest of the rear seat and the position of the rear seat. If the rear seat is located in the non-linkage area, the inclination of the backrest of the rear seat and the position of the rear seats are allowed to be adjusted independently. If the rear seat is located in the linkage area, a linkage control logic is performed on the rear seat. In the case where the rear seat is located in the linkage area, the seat controller will combine the command to adjust the backrest of the rear seat and the command to adjust the position of the rear seat sent by the user according to Table 1, and output a combined adjustment command for the rear seat. Then, from a pre-calibrated correspondence between inclinations of backrest of a rear seat and positions of the rear seat, a position corresponding to the current inclination of the backrest is determined as the target position. Then, a position difference between the target position and the current position is calculated according to a direction of the front-back adjustment of the rear seat (if the whole seat is adjusted forward, the position difference=the current position−the target position; if the whole seat is adjusted backward, the position difference=the target position−the current position). The position difference is inputted to the proportional integral controller, which then automatically adjusts output parameters according to the position difference, wherein P is the proportional coefficient, I is the integral coefficient, Σ represents a function of summing the proportion part and integral part. Finally, an output of the proportional integral controller is converted into a pulse width duty cycle, and the output of the proportional integral controller is limited within an effective range to control the speed of front-back adjustment of the body of the rear seat.

Because the control scheme will be quickly repeated in the seat controller, the position difference between the current position and the target position will also be rapidly updated and changed during movement of the seat. In the fast update iteration of the closed-loop control, the position difference will approach zero, and the output of the proportional integral controller will be stabilized near a value. At this time, the speed of the front-back adjustment of the rear seat will reach a steady value that is matched with the adjustment of the backrest.

Figure 11:
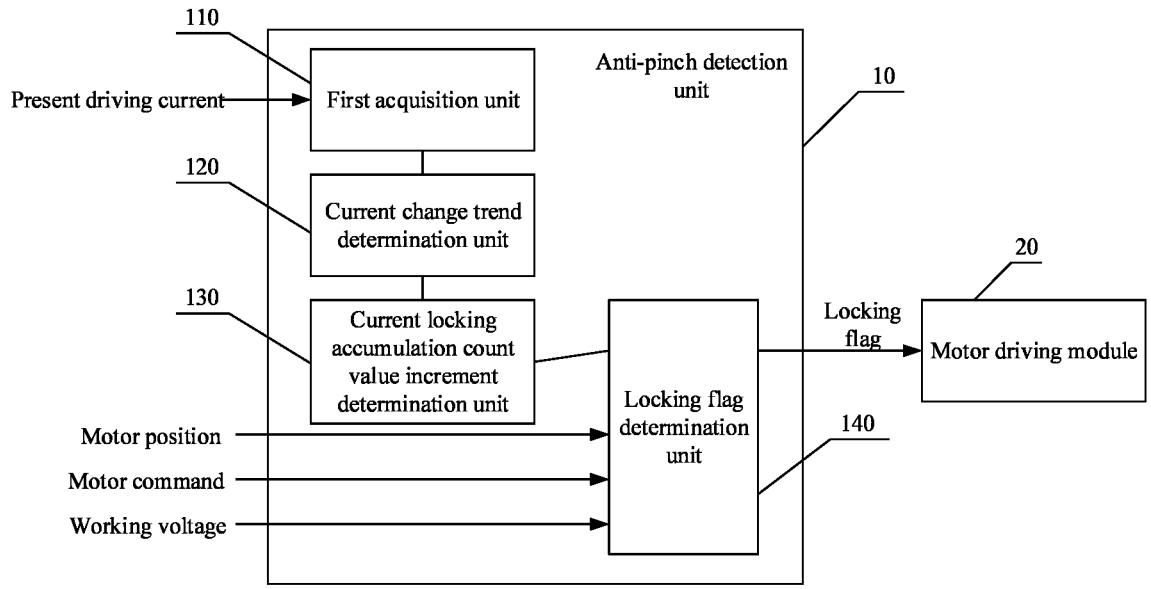
FIG. 11 is a structural block diagram of a seat controller according to an embodiment of the application.

The embodiments of the application also provide a seat controller, as shown in FIG. 11, which is a structural block diagram of a seat controller according to an embodiment of the application. The seat controller according to the embodiment includes: an anti-pinch detection module 10 and a motor driving module 20.

The anti-pinch detection module includes a first acquisition unit 110, a current change trend determination unit 120, a current locking accumulative count value increment determination unit 130, and a locking flag determination unit 140.

The first acquisition unit 110 is configured to acquire, after driving of a seat motor is stabilized, present driving currents of the seat motor according to preset cycles, and record the present driving current in a first cycle as a temporary current value corresponding to the first cycle.

The current change trend determination unit 120 is configured to compare, during operation of the seat motor and for each of the cycles, the present driving current and a temporary current value corresponding to a previous cycle to determine a difference, and determine a temporary current value corresponding to each of the cycles and current change trend of each of the cycles.

The current locking accumulative count value increment determination unit 130 is configured to compare the current change trend of the present cycle with the current change trend of the previous cycle, and increase an increment of a current locking accumulative count value in a case where the current change trend of the present cycle is the same as the current change trend of the previous cycle, wherein an change in the current locking accumulative count value is associated with the difference between the present driving current and the temporary current value corresponding to the previous cycle.

The locking flag determining unit 140 is configured to determine a locking flag according to a magnitude relationship between the current locking accumulative count value and a first threshold.

The motor driving module 20 is communicatively coupled with the anti-pinch detection module 10 and is configured to receive the locking flag output by the anti-pinch detection module 10 to stop driving of the seat motor in a motor driving mode.

Optionally, the current change trend determination unit 120 may be specifically configured to:
 in a case where the difference is greater than a positive value of an absolute value of a current threshold, increase a current locking accumulative count value by an increment of the current locking accumulative count value in the present cycle, and record the present driving current as the temporary current value corresponding to the cycle;
 in a case where the difference is smaller than a negative value of the absolute value of the current threshold, decrease the current locking accumulative count value by the increment of the current locking accumulative count value in the cycle, and record the present driving current as the temporary current value corresponding to the present cycle;
 and in a case where the difference is not greater than the positive value of the absolute value of the current threshold or is not smaller than the negative value of the absolute value of the current threshold, increase a temporary current update count value, and record the temporary current value corresponding to the previous cycle as the temporary current value corresponding to the cycle.

Optionally, the current change trend determination unit 120 may be further configured to:
 record, in the case where the current locking accumulative count value is increased, the current change trend as increase in current; and record, in the case where the current locking accumulative count value is decreased, the current change trend as decrease in current, wherein the temporary current update count value is cleared.

Optionally, the increment of the current locking accumulative count value represents a change amount of value of the current locking accumulative count value that is to be increased or decreased in each of the cycles. The current locking accumulative count value increment determination unit 130 is specifically configured to:
 increase, in a case where both the current change trend of the previous cycle and the current change trend of the present cycle are either increase or decrease in current, the increment of the current locking accumulative count value, such that the current locking accumulative count value of a next cycle is greater than the current locking accumulative count value of the present cycle, wherein the temporary current update count value is cleared.

Optionally, the locking flag determining unit 140 is specifically configured to:
 in a case where the current locking accumulative count value is greater than the first threshold, set the locking current value to be the present driving current at a time when the current locking accumulative count value is 0 and output the locking flag.

Optionally, the locking flag determining unit 140 may also further configured to:
 clear, in a case where the current locking accumulative count value is less than half of the first threshold, the locking flag and set the locking current value to be the present driving current.

Figure 12:
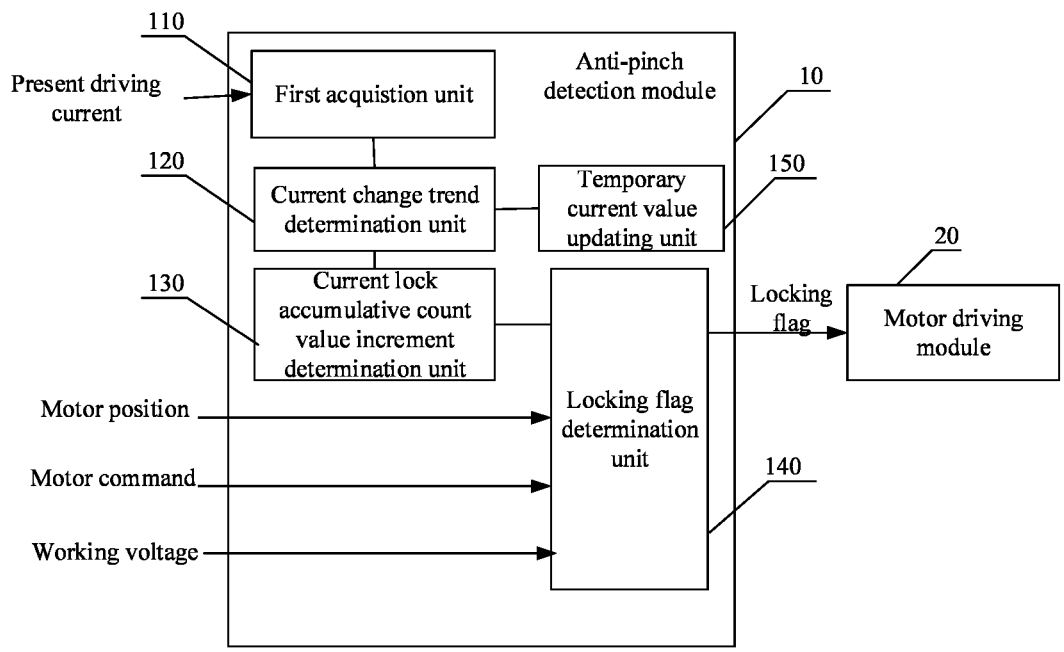
FIG. 12 is another structural block diagram of a seat controller according to an embodiment of the application.

FIG. 12 is another structural block diagram of a seat controller according to an embodiment of the application. On the basis of the embodiment shown in FIG. 11, the seat controller according to the embodiment further includes:
 a temporary current value updating unit 150 which is configured to record, in a case where the temporary current update count value is greater than a second threshold, the present driving current as the temporary current value corresponding to the present cycle, wherein the second threshold corresponds to a duration threshold in which the temporary current value is not updated continuously.

Figure 13:
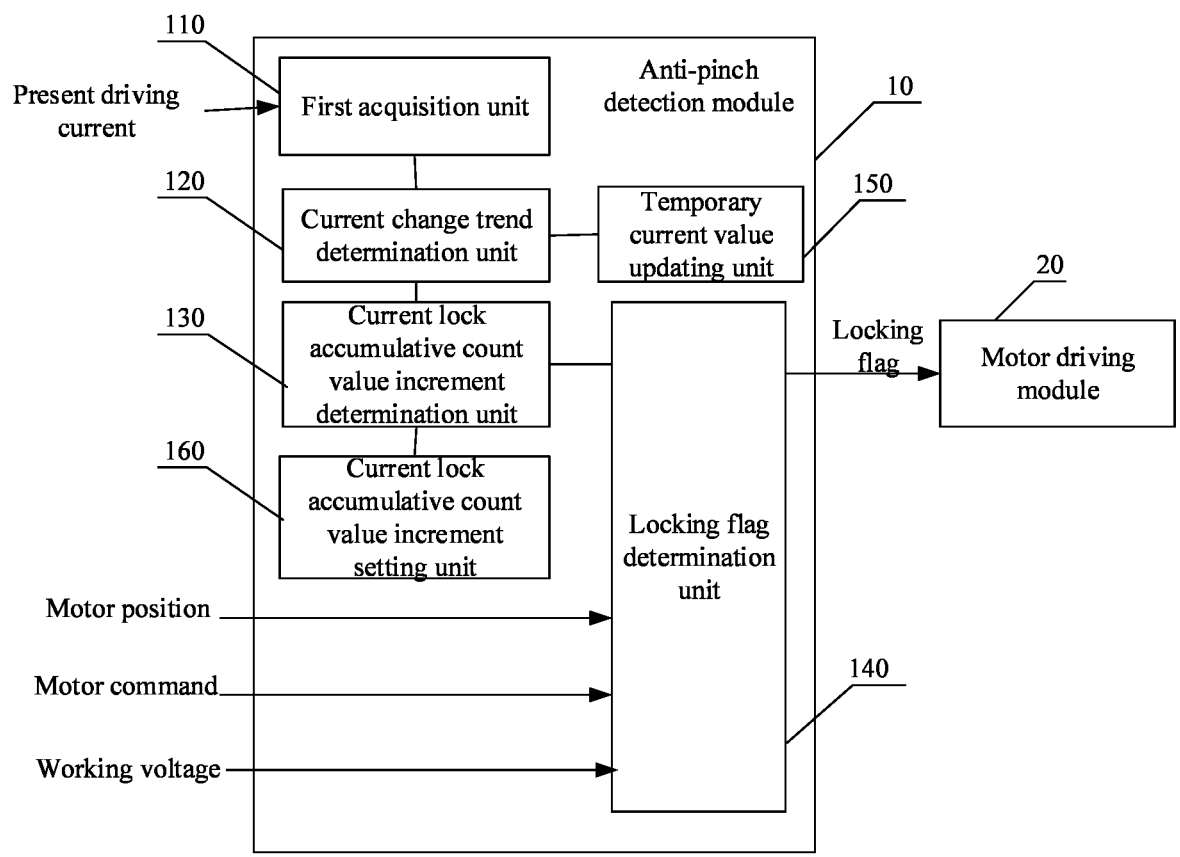
FIG. 13 is another structural block diagram of a seat controller according to an embodiment of the application.

FIG. 13 is another structural block diagram of a seat controller according to an embodiment of the application. On the basis of the embodiment shown in FIG. 12, the seat controller according to an embodiment further includes:
 a current locking accumulative count value increment setting unit 160 which is configured to: in a case where the current change trend of the previous cycle is different from the current change trend of the present cycle, clear a current trend flag bit which represents the current change trend and a temporary current update count value, and set the increment of the current locking accumulative count value to be an initial value, wherein the initial value is greater than the increment used for increasing of the current locking accumulative count value.

Figure 14:
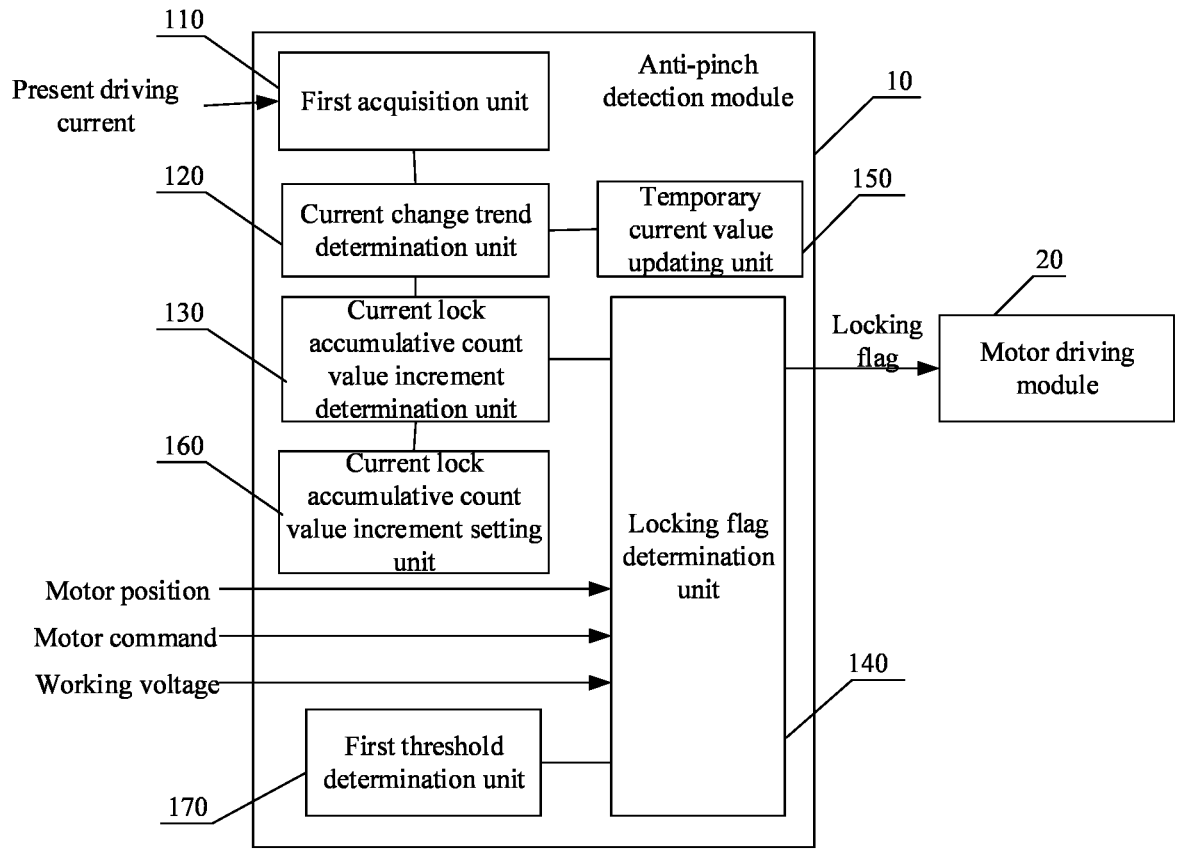
FIG. 14 is another structural block diagram of a seat controller according to an embodiment of the application.

FIG. 14 is another structural block diagram of a seat controller according to an embodiment of the application. On the basis of the embodiment shown in FIG. 13, the seat controller according to the embodiment further includes:
 a first threshold determining unit 170 which is configured to: acquire the first threshold for the present cycle by looking up a threshold table according to a motor position, a movement direction and a working voltage of the seat motor in the present cycle, wherein the threshold table is obtained through calibration according to characteristics of a real seat motor, wherein different thresholds are calibrated according to different characteristics of the real seat motor, and wherein the characteristics of the real seat include a motor position, a motor command and a working voltage.

Figure 15:
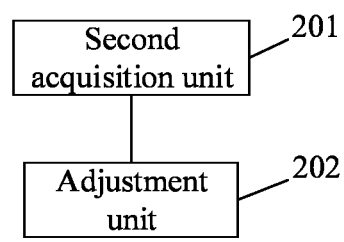
FIG. 15 is yet another structural block diagram of a seat controller according to an embodiment of the application.

FIG. 15 is another structural block diagram of a seat controller according to an embodiment of the application. The seat controller according to the embodiment may further include a second acquisition unit 201 and an adjustment unit 202.

The second acquisition unit 201 is configured to acquire inclination of backrest of a rear seat and a position of the rear seat.

In a practical application, a guide rail is fixed below the rear seat, and the entire guide rail is regarded as 100%. The position of the rear seat, as determined by the seat controller, is a position of the rear seat in the guide rail.

The adjustment unit 202 is configured to issue, based on the inclination of backrest of the rear seat and the position of the rear seat, a backrest adjustment command to the rear seat to adjust the inclination of the backrest of the rear seat and/or the position of the rear seat, and the backrest of the rear seat is kept in a state in which the backrest of the rear seat does not squeeze a trunk clapboard during adjustment, wherein in a case where the backrest of the rear seat is immediately close to the trunk clapboard, the inclination of the backrest of the rear seat and the position of the rear seat are adjusted in linkage according to a pre-calibrated relation curve between inclinations of backrest of a rear seat and positions of the rear seat.

The adjustment of inclination of the backrest of the rear seat or the adjustment of the position of the rear seat may be adjustment forward or adjustment backward. The adjustment forward refers to adjustment towards the front of the vehicle, and the adjustment backward refers to adjustment towards the rear of the vehicle.

In the embodiment, in a case where the backrest of the rear seat is immediately close to the trunk clapboard (for example, the top of the backrest of the rear seat is immediately close to the trunk clapboard), the inclination of the backrest of the rear seat and the position of the current rear seat may be adjusted in linkage in accordance with a pre-calibrated relation curve between inclinations of backrest of a rear seat and positions of the rear seat, as shown in FIG. 7, which will not be repeated here.

To sum up, the application discloses a seat controller. The seat controller is configured to: acquire inclination of backrest of a rear seat and a position of the rear seat; issue, based on the inclination of backrest of the rear seat and the position of the rear seat, a backrest adjustment command to the rear seat to adjust the inclination of the backrest of the rear seat and/or the position of the rear seat, wherein the backrest of the rear seat is kept in a state in which the backrest of the rear seat does not squeeze a trunk clapboard during adjustment, and wherein in a case where the backrest of the rear seat is immediately close to the trunk clapboard, the inclination of the backrest of the rear seat and the position of the rear seat are adjusted in linkage according to a pre-calibrated relation curve between inclinations of backrest of a rear seat and position of the rear seat. In the application, the inclination of the backrest of the rear seat and the position of the rear seat are adjusted in linkage, to make the backrest of the rear seat to be immediately close to the trunk clapboard in real time, which is relatively beautiful and can prevent an object from falling into a gap between the backrest of the rear seat and the trunk clapboard.

In some possible implementations according to embodiments of the application, the seat controller may further include:

a speed adjusting unit which is configured to adjust the position of the rear seat at an adjustable speed by using a proportional integral control module with a duty cycle of PWM driven by the second motor as a control variable.

In some possible implementations according to embodiments of the application, the speed adjusting unit may be specifically configured to:

subtract the position of the rear seat from a target position when the position of the rear seat is adjusted further away from the rear of the vehicle, or subtract the target position from the position of the rear seat when the position of the rear seat is adjusted toward the rear of the vehicle;

and, in the case that a result of the subtraction operation is positive, input a positive value to an adjuster of the proportional integral control module to increase the speed of the adjustment of the position of the rear seat, or in the case that the result of the subtraction operation is negative, input a negative value to the adjuster of the proportional integral control module to reduce the speed of the adjustment of the position of the rear seat.

In the embodiment, specific working principle of the speed adjustment unit may be found in corresponding descriptions about method embodiments, and will not be repeated here.

The embodiment of the application provides a computer program product. Instructions in the computer program product, when executed by a processor of an electronic device, cause the electronic device to perform the seat control method according to the embodiments of the application and achieve the same technical effects. To avoid repetition, it will not be repeated here.

In the specification, the embodiments are described in a progressive manner. Each embodiment focuses on differences from other embodiments, and the same or similar parts of the embodiments can be referred to each other. For the disclosed device embodiments, they correspond to the method embodiments, and thus are described in a relatively simple way, and their details may be obtained from the description of the method embodiments.

A person skilled in the art can further realize that units and algorithm steps of each example described in connection with the embodiments disclosed herein can be implemented in electronic hardware, computer software, or a combination thereof. In order to clearly explain interchangeability of hardware and software, the components and steps of each example have been generally described in the above description according to their functions. Whether these functions are implemented in hardware or software depends on a specific application and design constraints of the technical solutions. A person skilled in the art can use a different method for a specific application to realize the described functions, but such implementation should not be considered beyond the scope of the application.

The steps of the method or algorithm described in connection with the embodiments disclosed herein can be directly implemented in hardware, software modules executed by a processor, or a combination thereof. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The above description of the disclosed embodiments is provided to enable a person skilled in the art to realize or use the application. Various modifications to these embodiments will be apparent to a person skilled in the art. The general principles defined herein can be implemented in other embodiments without departing from the gist or scope of the application. Therefore, the application will not be limited to these embodiments described herein, but will conform to a broadest scope consistent with the principles and novel features disclosed herein.

What is claimed is:

1. A seat control method implemented in a seat controller, comprises:
    acquiring, after driving of a seat motor is stabilized, present driving currents of the seat motor according to preset cycles, and recording the present driving current in a first cycle as a temporary current value corresponding to the first cycle;
    comparing, during operation of the seat motor and for each of the cycles, the present driving current and a temporary current value corresponding to a previous cycle to determine a difference, and then determining, during operation of the seat motor, a temporary current value corresponding to each of the cycles and current change trend of each of the cycles;
    comparing the current change trend of a present cycle with the current change trend of the previous cycle, and increasing an increment of a current locking accumulative count value in a case where the current change trend of the present cycle is the same as the current change trend of the previous cycle, wherein a change in the current locking accumulative count value is associated with the difference between the present driving current and the temporary current value corresponding to the previous cycle; and
    determining a locking flag according to a magnitude relationship between the current locking accumulative count value and a first threshold;
    stopping driving of the seat motor in a motor driving mode based on the block flag.

2. The seat control method according to claim 1, wherein the comparing, during operation of the seat motor and for each of the cycles, the present driving current and the temporary current value corresponding to a previous cycle to determine the difference, and then determining, during operation of the seat motor, the temporary current value corresponding to each of the cycles and the current change trend of each of the cycles comprises:
    increasing, in a case where the difference is greater than a positive value of an absolute value of a current threshold, the current locking accumulative count value by the increment of the current locking accumulative count value in the present cycle, and recording the present driving current as the temporary current value corresponding to the present cycle and the current change trend of the present cycle as increase in current;
    decreasing, in a case where the difference is smaller than a negative value of the absolute value of the current threshold, the current locking accumulative count value by the increment of the current locking accumulative count value in the present cycle, and recording the present driving current as the temporary current value corresponding to the present cycle and the current change trend of the present cycle as decrease in current; and
    increasing, in a case where the difference is not greater than the positive value of the absolute value of the current threshold or is not smaller than the negative value of the absolute value of the current threshold, a temporary current update count value, and recording the temporary current value corresponding to the previous cycle as the temporary current value corresponding to the present cycle.

3. The seat control method according to claim 2, wherein the comparing, during operation of the seat motor and for each of the cycles, the present driving current and the temporary current value corresponding to a previous cycle to determine the difference, and then determining, during operation of the seat motor, the temporary current value corresponding to each of the cycles and the current change trend of each of the cycles further comprises:
    recording, in the case where the current locking accumulative count value is increased, the current change trend as increase in current;
    recording, in the case where the current locking accumulative count value is decreased, the current change trend as decrease in current;
    wherein the temporary current update count value is cleared.

4. The seat control method according to claim 1, wherein the increment of the current locking accumulative count value represents a change amount of value of the current locking accumulative count value that is to be increased or decreased in each of the cycles;
    wherein the comparing the current change trend of the present cycle with the current change trend of the previous cycle, and increasing the increment of a current locking accumulative count value in a case where the current change trend of the present cycle is the same as the current change trend of the previous cycle comprises:
    increasing, when both the current change trend of the previous cycle and the current change trend of the present cycle are either increase or decrease in current, the increment of the current locking accumulative count value, such that the current locking accumulative count value of a next cycle is greater than the current locking accumulative count value of the present cycle;
    wherein the temporary current update count value is cleared.

5. The seat control method according to claim 1, wherein the determining the locking flag according to the magnitude relationship between the current locking accumulative count value and the first threshold comprises:
    in a case where the current locking accumulative count value is greater than the first threshold, setting a locking current value to be the present driving current at a time when the current locking accumulative count value is 0 and outputting the locking flag.

6. The seat control method according to claim 5, wherein the determining the locking flag according to the magnitude relationship between the current locking accumulative count value and the first threshold further comprises:
    in a case where the current locking accumulative count value is less than half of the first threshold, clearing the locking flag and setting the locking current value to be the present driving current.

7. The seat control method according to claim 2, further comprising:

recording, in a case where the temporary current update count value is greater than a second threshold, the present driving current as the temporary current value corresponding to the present cycle;

wherein the second threshold corresponds to a duration threshold in which the temporary current value is not updated continuously.

8. The seat control method according to claim 1, further comprising:

clearing, in a case where the current change trend of the previous cycle is different from the current change trend of the present cycle, a current trend flag bit which represents current change trend and a temporary current update count value; and setting the increment of the current locking accumulative count value to be an initial value;

wherein the initial value is greater than the increment used for increasing of the current locking accumulative count value.

9. The seat control method according to claim 5, further comprising:

acquiring the first threshold for the present cycle by looking up a threshold table according to a motor position, a movement direction and a working voltage of the seat motor in the present cycle;

wherein the threshold table is obtained by calibration according to characteristics of a real seat motor, wherein during the calibration, different thresholds are calibrated according to different characteristics of the real seat motor, and wherein the characteristics of the real seat include a motor position, a motor command and a working voltage.

10. The seat control method according to claim 1, further comprising:

acquiring inclination of backrest of a rear seat and a position of the rear seat;

issuing, based on the inclination of backrest of the rear seat and the position of the rear seat, a backrest adjustment command to the rear seat to adjust the inclination of the backrest of the rear seat and/or the position of the rear seat, wherein the backrest of the rear seat is kept in a state in which the backrest of the rear seat does not squeeze a trunk clapboard during adjustment, wherein in a case where the backrest of the rear seat is immediately close to the trunk clapboard, the inclination of the backrest of the rear seat and the position of the rear seat are adjusted in linkage according to a pre-calibrated relation curve between inclinations of backrest of a rear seat and positions of the rear seat.

11. The seat control method according to claim 10, wherein in the case where the backrest of the rear seat is immediately close to the trunk clapboard, a space in which the inclination of the backrest of the rear seat and the position of the rear seat are adjustable in linkage is a linkage area;

an adjustable space, associated with the inclination of the backrest of the rear seat and the position of the rear seat, outside the linkage area is a non-linkage area;

in the non-linkage area, the inclination of the backrest of the rear seat is freely adjustable within a first inclination adjustment range with respect to the position of the rear seat, and the position of the rear seat is freely adjustable within a first position adjustment range along an extension direction of a body of a vehicle with respect to the inclination of the backrest of the rear seat;

wherein within the first inclination adjustment range and the first position adjustment range, the backrest of the rear seat is kept in the state in which the backrest of the rear seat does not squeeze a trunk clapboard during adjustment.

12. The seat control method according to claim 11, wherein the backrest adjustment command comprises: a command to adjust the inclination of the rear seat and a command to adjust the position of the rear seat;

in the linkage area, the command to adjust the inclination of the rear seat and the command to adjust the position of the rear seat are combined into a combined adjustment command;

in the non-linkage area, the command to adjust the inclination of the rear seat and the command to adjust the position of the rear seat are executed independently;

wherein the command to adjust the inclination of the rear seat is used to control movement of a first motor which is provided to adjust the inclination of the rear seat back, and the command to adjust the position of the rear seat is used to control movement of a second motor which is provided to adjust the position of the rear seat.

13. The seat control method according to claim 12, wherein the combined adjustment command comprises a command to:

stop adjustment of the inclination of the backrest of the rear seat, and stop adjustment of the front-back position of the rear seat; or, adjust the inclination of the backrest of rear seat to make the inclination smaller, and adjust the position of the rear seat to make the position closer to rear of the vehicle; or, adjust the inclination of the back of rear seat to make the inclination greater, and adjust the position of the rear seat to make the position closer to the rear of the vehicle; or, adjust the inclination of the back of rear seat to make the inclination smaller, and adjust the position of the rear seat to make the position further away from the rear of the vehicle.

14. The seat control method according to claim 12, wherein during adjustment of the inclination of the backrest of the rear seat and the position of the rear seat within the non-linkage area, the inclination of the backrest of the rear seat is adjusted to make the inclination greater in response to the command to adjust the inclination of the backrest of the rear seat contained in a rear seat adjustment command such that the adjustable space associated with the inclination of the backrest of the rear seat and the position of the rear seat is switched from the non-linkage area to the linkage area;

the command to adjust the inclination of the backrest of the rear seat and the command to adjust the position of the rear seat are combined into on the combined adjustment command, and the combined adjustment command is executed to perform adjustment of the inclination of the backrest of the rear seat and adjustment of the position of the rear seat in linkage;

wherein the second motor is started before the switching to the linkage area.

15. The seat control method according to claim 12, wherein during adjustment of the inclination of the backrest of the rear seat and the position of the rear seat within the linkage area, the inclination of the backrest of the rear seat is adjusted to make the inclination smaller in response to the combined adjustment command such that the adjustable space associated with the inclination of the backrest of the rear seat and the position of the rear seat is switched from the linkage area to the non-linkage area;
the combined adjustment command is switched to the command to adjust the inclination of the backrest of the rear seat, and adjustment of the position of the rear seat is stopped;
wherein the command to adjust the inclination of the backrest of the rear seat indicates adjustment of the inclination of the backrest of the rear seat to make the inclination smaller.

16. The seat control method according to claim 12, wherein during adjustment of the inclination of the backrest of the rear seat and the position of the rear seat within the linkage area,
the inclination of the backrest of the rear seat and the position of the rear seat are adjusted by directly switching out of the linkage area in a case where the position of the rear seat reaches a position closest to the rear of the vehicle.

17. The seat control method according to claim 10, wherein adjusting of the position of the rear seat comprises:
adjusting the position of the rear seat at an adjustable speed by using a proportional integral control module with a duty cycle of PWM driven by a second motor as a control variable.

18. The seat control method according to claim 17, wherein the adjusting the position of the rear seat at an adjustable speed by using the proportional integral control module with a duty cycle of PWM driven by a second motor as a control variable comprises:
performing a subtraction operation on the position of the rear seat and a target position after adjustment, wherein in a case where the position of the rear seat is adjusted further away from the rear of the vehicle, the position of the rear seat is subtracted from the target position, or in a case where the position of the rear seat is adjusted closer to the rear of the vehicle, the target position is subtracted from the position of the rear seat; and
inputting, in a case where a result of the subtraction operation is a positive value, the positive value to an adjuster of the proportional integral control module to increase a speed of adjustment of the position of the rear seat, or inputting, in a case where the result of the subtraction operation is a negative value, the negative value to the adjuster of the proportional integral control module to reduce the speed of adjustment of the position of the rear seat.

19. A seat controller, comprising: an anti-pinch detection module and a motor driving module, wherein the anti-pinch detection module comprises:
a processor; and
a memory storing instructions;
wherein the processor is configured to execute the instructions to:
acquire, after driving of a seat motor is stabilized, present driving currents of the seat motor according to preset cycles, and record the present driving current in a first cycle as a temporary current value corresponding to the first cycle;
compare, during operation of the seat motor and for each of the cycles, the present driving current and a temporary current value corresponding to a previous cycle to determine a difference, and then determine a temporary current value corresponding to each of the cycles and current change trend of each of the cycles;
compare the current change trend of a present cycle with the current change trend of the previous cycle, and increase an increment of a current locking accumulative count value in a case where the current change trend of the present cycle is the same as the current change trend of the previous cycle, wherein a change in the current locking accumulative count value is associated with the difference between the present driving current and the temporary current value corresponding to the previous cycle; and
determine a locking flag according to a magnitude relationship between the current locking accumulative count value and a first threshold; and
wherein the motor driving module is communicatively coupled with the anti-pinch detection module, and is configured to receive the locking flag outputted by the anti-pinch detection module to stop driving of the seat motor in a motor driving mode.

20. A non-transitory computer program product, having instructions therein, wherein the instructions, when executed by a processor of an electronic device, cause the electronic device to perform a seat control method according to claim 1.

* * * * *